(12) United States Patent
Lor et al.

(10) Patent No.: US 9,454,177 B2
(45) Date of Patent: Sep. 27, 2016

(54) ELECTRONIC DEVICES WITH HOUSING-BASED INTERCONNECTS AND COUPLING STRUCTURES

(71) Applicant: Apple Inc., Cupertino, CA (US)

(72) Inventors: Jason Lor, San Francisco, CA (US); Siddharth Nangia, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 173 days.

(21) Appl. No.: 14/181,518

(22) Filed: Feb. 14, 2014

(65) Prior Publication Data

US 2015/0237757 A1 Aug. 20, 2015

(51) Int. Cl.
*H01Q 1/24* (2006.01)
*G06F 1/16* (2006.01)

(52) U.S. Cl.
CPC ...................... *G06F 1/16* (2013.01)

(58) Field of Classification Search
None
See application file for complete search history.

(56) References Cited

U.S. PATENT DOCUMENTS

| | | | | |
|---|---|---|---|---|
| 3,695,510 A | * | 10/1972 | Ruesch | 234/30 |
| 4,545,647 A | * | 10/1985 | Sasaki et al. | 349/60 |
| 4,574,236 A | * | 3/1986 | Hechtman | 324/755.05 |
| 4,814,729 A | * | 3/1989 | Becker | 333/24 C |
| 5,184,400 A | * | 2/1993 | Cray et al. | 29/879 |
| 5,246,817 A | * | 9/1993 | Shipley, Jr. | 430/312 |
| 5,435,733 A | * | 7/1995 | Chernicky et al. | 439/68 |
| 5,946,194 A | * | 8/1999 | Dudas et al. | 361/737 |
| 6,225,696 B1 | | 5/2001 | Hathaway et al. | |
| 6,556,453 B2 | | 4/2003 | Figueroa et al. | |
| 6,819,293 B2 | * | 11/2004 | De Graauw | 343/702 |
| 7,286,372 B2 | | 10/2007 | Aronson et al. | |
| 7,342,544 B2 | * | 3/2008 | Tsai et al. | 343/702 |
| 7,569,916 B2 | * | 8/2009 | Weiss | 257/664 |
| 7,828,987 B2 | | 11/2010 | Schneider et al. | |
| 7,837,481 B1 | * | 11/2010 | Mahoney et al. | 439/81 |
| 8,199,518 B1 | * | 6/2012 | Chun et al. | 361/767 |
| 8,237,228 B2 | * | 8/2012 | Or-Bach et al. | 257/369 |
| 8,262,411 B2 | | 9/2012 | Kondo | |
| 8,536,462 B1 | * | 9/2013 | Darveaux et al. | 174/260 |
| 8,754,818 B2 | * | 6/2014 | Yen et al. | 343/702 |
| 8,836,587 B2 | * | 9/2014 | Darnell et al. | 343/702 |
| 2003/0020654 A1 | * | 1/2003 | Navarro et al. | 343/700 MS |
| 2004/0066334 A1 | * | 4/2004 | Fang et al. | 343/700 MS |
| 2004/0156576 A1 | * | 8/2004 | Windover | 385/14 |
| 2005/0269665 A1 | | 12/2005 | Wylie et al. | |
| 2008/0055164 A1 | * | 3/2008 | Zhang et al. | 343/702 |
| 2008/0246136 A1 | * | 10/2008 | Haba et al. | 257/686 |

(Continued)

FOREIGN PATENT DOCUMENTS

WO 2006120627 11/2006

*Primary Examiner* — Xanthia C Cunningham
(74) *Attorney, Agent, or Firm* — Treyz Law Group, P.C.; G. Victor Treyz; Joseph F. Guihan

(57) ABSTRACT

An electronic device has an electronic device housing containing electrical components such as integrated circuits and other components. The electronic device housing may be provided with an interconnect stack that has layers of dielectric and metal traces forming signal paths. Electrical components may be mounted on printed circuits. Coupling structures such as screws or other fasteners, washers, standoffs, nuts, springs, and spring-loaded pins may be used in forming signal paths that couple the signal paths of the interconnect stack to components such as buttons, batteries, printed circuits with integrated circuits, displays, and other circuitry.

9 Claims, 27 Drawing Sheets

(56) References Cited

U.S. PATENT DOCUMENTS

| | | | |
|---|---|---|---|
| 2009/0160712 A1* | 6/2009 | Breiter et al. | 343/702 |
| 2010/0060529 A1* | 3/2010 | Schlub et al. | 343/702 |
| 2010/0123233 A1* | 5/2010 | Yoon et al. | 257/686 |
| 2010/0253538 A1* | 10/2010 | Smith | 340/870.02 |
| 2011/0006953 A1* | 1/2011 | Chiang et al. | 343/702 |
| 2011/0012793 A1* | 1/2011 | Amm et al. | 343/702 |
| 2011/0084884 A1* | 4/2011 | Kuo et al. | 343/702 |
| 2011/0255850 A1 | 10/2011 | Dinh et al. | |
| 2012/0050114 A1* | 3/2012 | Li et al. | 343/702 |
| 2012/0068890 A1* | 3/2012 | Haroun et al. | 343/702 |
| 2012/0068896 A1* | 3/2012 | White et al. | 343/713 |
| 2012/0087065 A1* | 4/2012 | Kim et al. | 361/679.01 |
| 2012/0118771 A1* | 5/2012 | Kim et al. | 206/320 |
| 2012/0157175 A1* | 6/2012 | Golko et al. | 455/575.7 |
| 2012/0176279 A1* | 7/2012 | Merz et al. | 343/702 |
| 2012/0176754 A1* | 7/2012 | Merz et al. | 361/751 |
| 2012/0236489 A1* | 9/2012 | Foo et al. | 361/679.32 |
| 2012/0262344 A1* | 10/2012 | Tsai et al. | 343/702 |
| 2012/0313822 A1* | 12/2012 | Long | 343/700 MS |
| 2013/0257659 A1* | 10/2013 | Darnell et al. | 343/702 |
| 2014/0042612 A1* | 2/2014 | Liu et al. | 257/734 |
| 2014/0184451 A1* | 7/2014 | Kuo | 343/702 |

* cited by examiner

ELECTRONIC DEVICES WITH HOUSING-BASED INTERCONNECTS AND COUPLING STRUCTURES

BACKGROUND

This relates generally to electronic devices and, more particularly, to interconnecting electrical components in electronic devices.

Electronic devices include integrated circuits and other electronic components. These components are mounted on printed circuit boards. Metal lines in the printed circuit boards serve as signal paths. The signal paths, which are sometimes referred to as interconnects, are used to route data and power signals between the integrated circuits and other electronic components in an electronic device.

The printed circuit boards and interconnect structures that are used in an electronic device can have a significant impact on device size and performance. If care is not taken, device housings will be bulkier that desired and printed circuit board interconnect structures will be more complex and costly than desired. Interconnects formed from thin flexible printed circuits may help minimize device bulk, but may be susceptible to damage on sharp internal housing features and may not be sufficiently compact for some applications.

It would therefore be desirable to be able to provide electronic devices with improved interconnect structures.

SUMMARY

An electronic device may have electrical components mounted within an electronic device housing. The electrical components may include integrated circuits and other circuitry mounted to a printed circuit board, display components, buttons, batteries, and other electrical components.

The electronic device housing may be formed from a material such as plastic, metal, fiber-based composite material, or other material. The housing may have an interior surface. Signal paths may be formed within an interconnect stack that is formed directly on the interior surface of the housing. The interconnect stack may have layers of dielectric and patterned metal traces.

Coupling structures such as screws or other fasteners, washers, springs, and spring-loaded pins may be used in forming signal paths that couple the signal paths of the interconnect stack to signal paths associated components such as buttons, batteries, printed circuits with integrated circuits, displays, and other circuitry. As an example, a screw, spring-loaded pin, or other structure may be segmented to form multiple parallel signal paths, each of which is coupled between a respective metal trace in the interconnect stack and a respective signal path on a printed circuit or other electrical component.

DETAILED DESCRIPTION

Electronic devices may be provided with housings. Electrical components may be mounted within the housings on substrates such as printed circuits. An electronic device may have signal paths formed from metal lines on a housing. Fasteners such as screws, nuts, gaskets, standoffs, springs, spring-loaded pins, and other coupling structures may be used to couple metal traces on printed circuits to metal traces on a housing. The fasteners and other coupling structures may, if desired, contain multiple signal paths for routing more than one signal at a time. The signals that are carried between electrical components by the signal paths on the housing, by the signal paths in the coupling structures, and by signal paths in the printed circuits may be data signals, power signals, analog signals, digital signals, or other suitable electrical signals.

Electrical components may be coupled to signal paths using solder, spring-based structures such as springs or spring-loaded pins, conductive adhesive, direct contact between metal traces, or other suitable coupling mechanisms.

Illustrative electronic devices that have housings, printed circuits, and coupling structures that may be provided with signal paths for interconnecting electrical components are shown in FIGS. 1, 2, 3, and 4.

Figure 1:
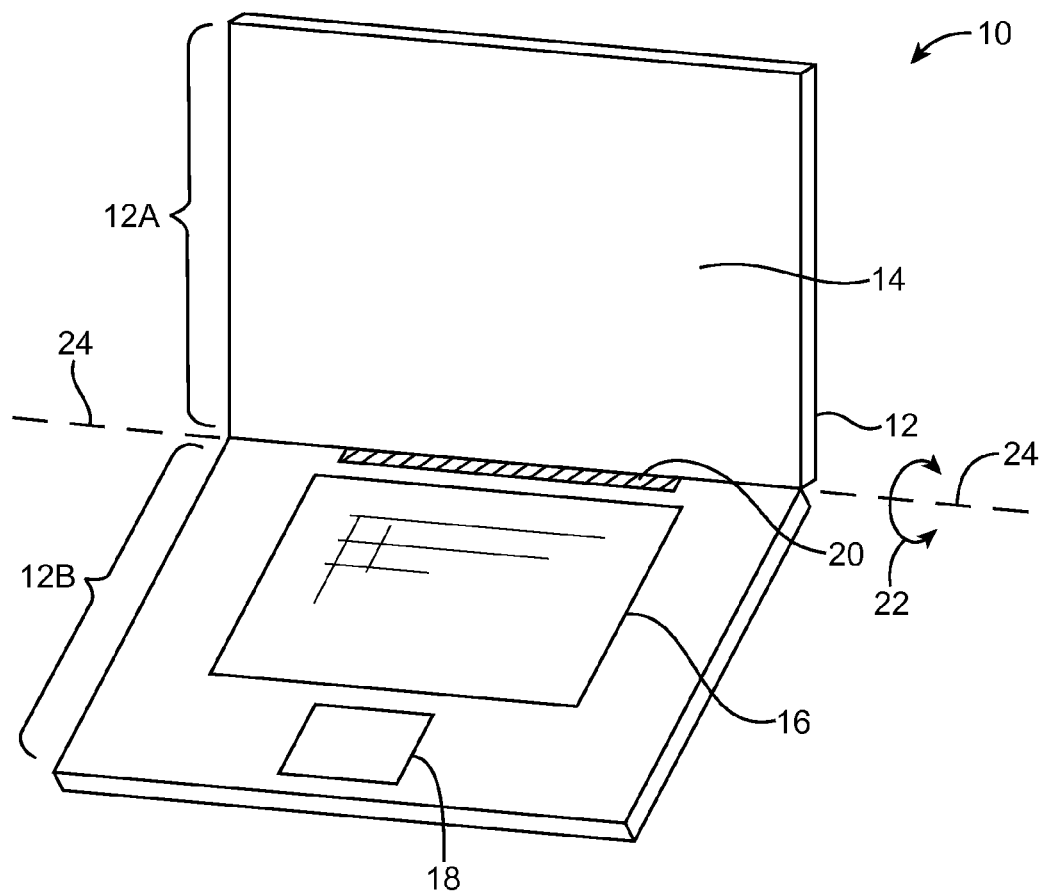
FIG. 1 is a perspective view of an illustrative electronic device such as a laptop computer in accordance with an embodiment.

Electronic device 10 of FIG. 1 has the shape of a laptop computer (portable computer) and has a portable computer housing 12 formed from upper housing 12A and lower housing 12B with components such as keyboard 16 and touchpad 18. Device 10 has hinge structures 20 (sometimes referred to as a clutch barrel) to allow upper housing 12A to rotate in directions 22 about rotational axis 24 relative to lower housing 12B. Display 14 is mounted in housing 12A. Upper housing 12A, which may sometimes be referred to as a display housing or lid, is placed in a closed position by rotating upper housing 12A towards lower housing 12B about rotational axis 24.

Figure 2:
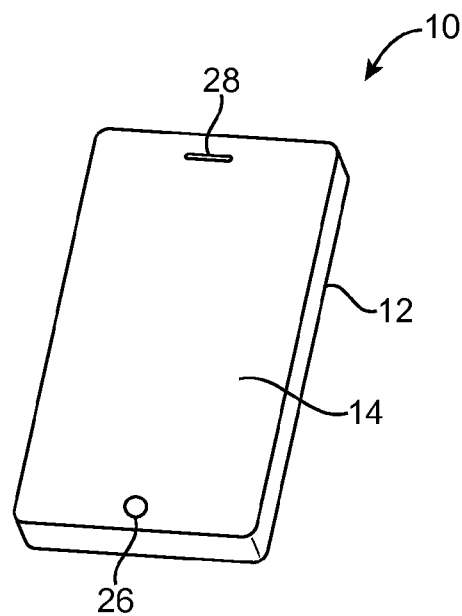
FIG. 2 is a perspective view of an illustrative electronic device such as a handheld electronic device in accordance with an embodiment.

FIG. 2 shows an illustrative configuration for electronic device 10 based on a handheld device such as a cellular telephone, music player, gaming device, navigation unit, or other compact device. In this type of configuration for device 10, device 10 (e.g., a cellular telephone) has opposing front and rear sides. Display 14 is mounted on a front face of device 10. Housing 12 may have a planar surface on the opposing rear face of device 10. Display 14 may have an exterior layer that includes openings for components such as button 26 and speaker port 28.

Figure 3:
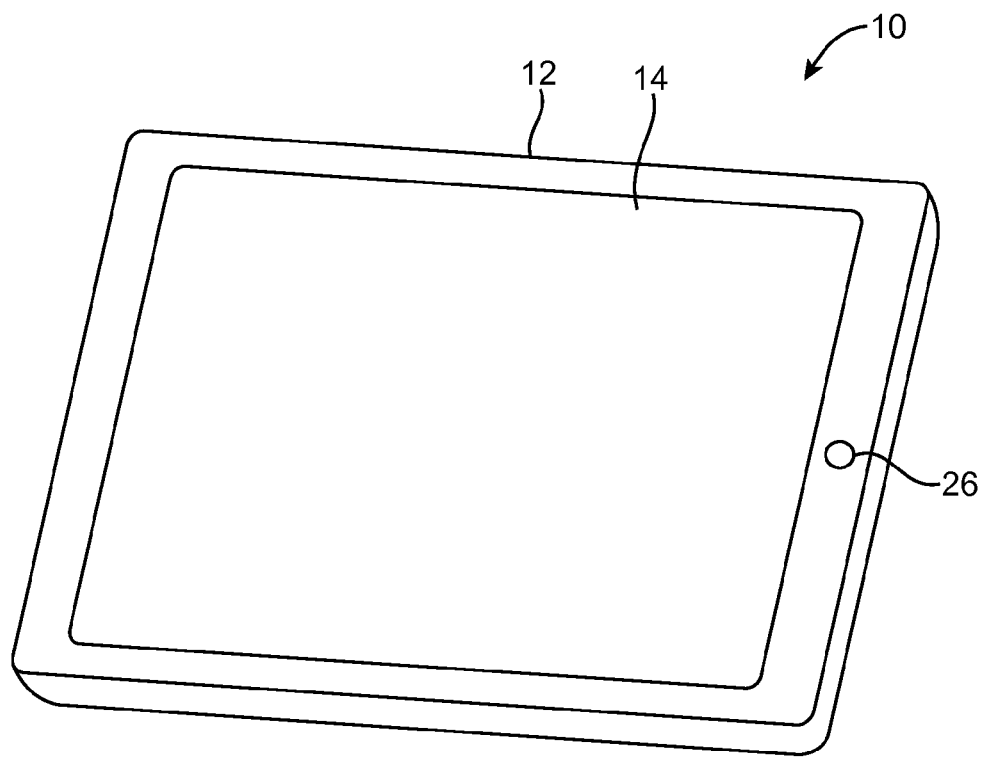
FIG. 3 is a perspective view of an illustrative electronic device such as a tablet computer in accordance with an embodiment.

In the example of FIG. 3, electronic device 10 is a tablet computer. In electronic device 10 of FIG. 3, tablet computer 10 has opposing planar front and rear surfaces. Display 14 is mounted on the front surface of device 10. Housing 12 may have a planar rear wall on the opposing rear surface of device 10. As shown in FIG. 3, display 14 has an external layer with an opening to accommodate button 26.

Figure 4:
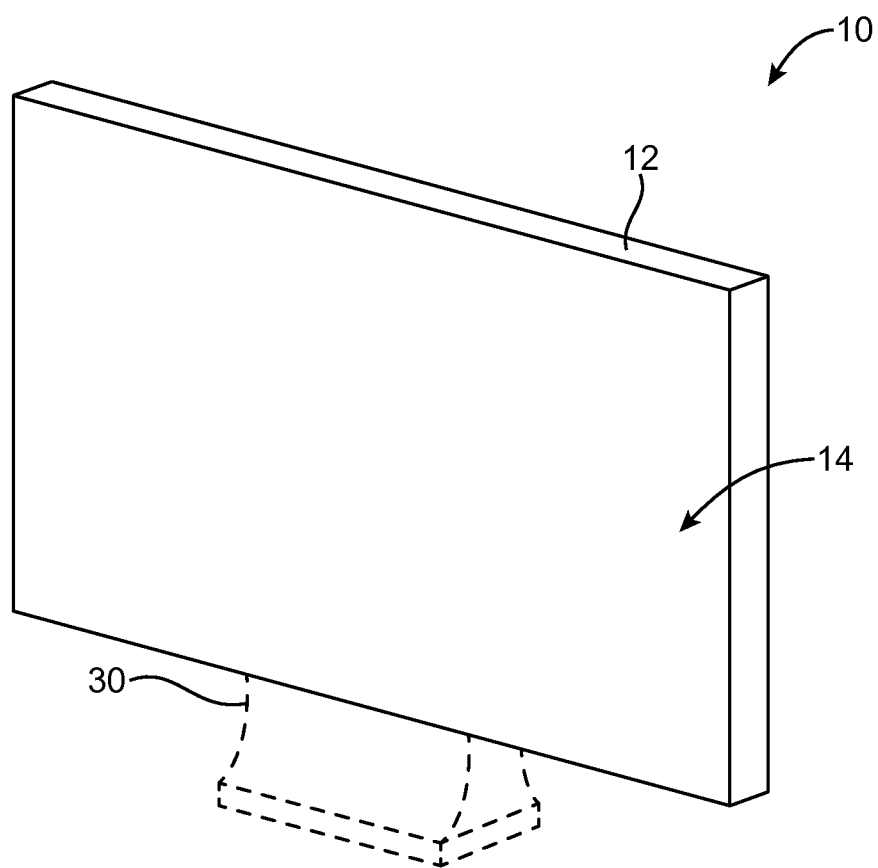
FIG. 4 is a perspective view of an illustrative electronic device such as a display for a computer or television in accordance with an embodiment.

FIG. 4 shows an illustrative configuration for electronic device 10 in which device 10 is a computer display, a computer that has an integrated computer display, or a television. Display 14 is mounted on a front face of device 10. With this type of arrangement, housing 12 for device 10 may be mounted on a wall or may have an optional structure such as support stand 30 to support device 10 on a flat surface such as a table top or desk.

Housing 12 in device 10 (e.g., housing 12 in devices of the type shown in FIGS. 1, 2, 3, and 4 and other electronic devices) may be provided with signal paths (sometimes referred to as interconnects or interconnect paths) for routing signals between electrical components in device 10. The signal paths may be formed from conductive metal signal lines. The conductive metal signal lines may be formed by photolithographic techniques, laser patterning, screen printing, pad printing, ink jet deposition, or other deposition and patterning techniques. Signal paths may be formed on the inner surfaces of housing 12 and may, if desired, be embedded within channels formed in housing 12. Coupling structures such as screws and other fasteners, gaskets, standoffs, nuts, springs, spring-loaded pins, and other spring-based coupling structures may be used to couple signal paths on housing 12 to signal paths in electrical components and signal paths on printed circuits to which electrical components are mounted.

Figure 5:
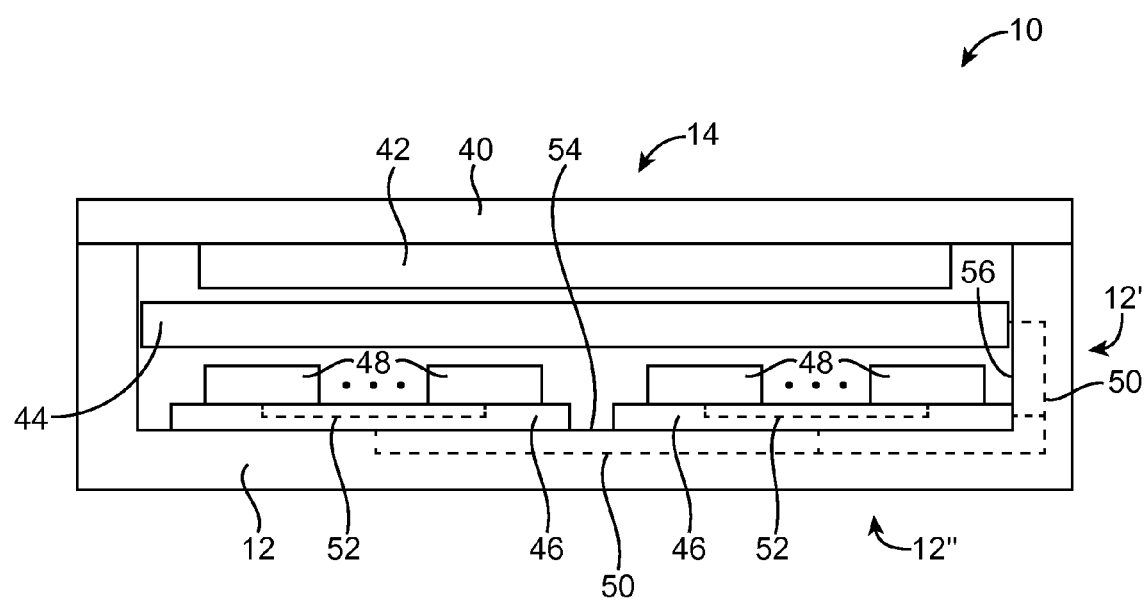
FIG. 5 is a cross-sectional side view of an electronic device in accordance with an embodiment.

A cross-sectional side view of an illustrative electronic device of the type that may be provided with signal lines on the inner surfaces of housing 12 and in channels in housing 12 is shown in FIG. 5. As shown in FIG. 5, display 14 may be formed from a display module such as display module 42 mounted under a cover layer such as display cover layer 40 (as an example). Display 14 (e.g., display module 42) may be a liquid crystal display, an organic light-emitting diode display, a plasma display, an electrophoretic display, a display that is insensitive to touch, a touch sensitive display that incorporates and array of capacitive touch sensor electrodes or other touch sensor structures, or may be any other type of suitable display. Display cover layer 40 may be layer of clear glass, a transparent plastic member, or other clear structure.

Device 10 may have inner housing structures that provide additional structural support to device 10 and/or that serve as mounting platforms for printed circuits and other structures. Structural internal housing members may sometimes be referred to as housing structures and may be considered to form part of housing 12.

Electrical components 48 may be mounted within the interior of housing 12. Components 48 may be mounted to inner surfaces of housing 12 and may be mounted to substrates that contain signal paths. As shown in FIG. 5, for example, components 48 may be mounted to printed circuit boards such as printed circuit boards 46. Printed circuit boards 46 may include rigid printed circuit boards (e.g., printed circuit boards formed from fiberglass-filled epoxy or other rigid printed circuit board material) and flexible printed circuits (e.g., flex circuits formed from sheets of polyimide or other flexible polymer layers). Patterned metal traces 52 within printed circuit boards 46 may be used to form signal paths between components 48. Conductive signal paths such as conductive signal paths 50 (e.g., metal lines) may also be formed in housing 12 (e.g., on interior housing surfaces or embedded within housing 12). Conductive signal paths 50 (sometimes referred to as interconnects or interconnect paths) may, for example, be formed from metal signal lines on in an interconnect stack formed on inner surface 54 of rear housing wall 12' and/or on inner surface 56 of housing sidewalls such as sidewall 12" or on other housing surfaces.

Signal paths such as paths 50 may be used to interconnect substrates such as printed circuits 46, thereby interconnecting electrical components such as components 48 on printed circuits 46. Signal paths such as paths 50 may also be used to interconnect components 48 on printed circuits 46 with other electrical components in device 10, such as batteries, displays, buttons, sensors, connectors, etc. As an example, conductive paths 50 (e.g., metal traces on housing 12) may be electrically coupled to components such as component 44 (e.g., a battery or other electrical device) and components such as display 14 (e.g., display module 42). Other electrical components may be coupled to components 48 and each other if desired. Electrical paths for coupling components together may include paths on printed circuits such as paths 52, housing-based paths such as paths 50, paths within components 48, 44, and 42, and signal paths in signal coupling structures. The coupling structures may be used to couple signal paths together (e.g., to couple paths 52 to paths 50, to couple paths in components such as components 44 and 40 to paths 50, etc.). Coupling structures can be based on screws or other fasteners, nuts, gaskets, standoffs, spring-based coupling structures such as spring-loaded pins, or other structures that include conductive structures that serve as signal paths.

Figure 6:
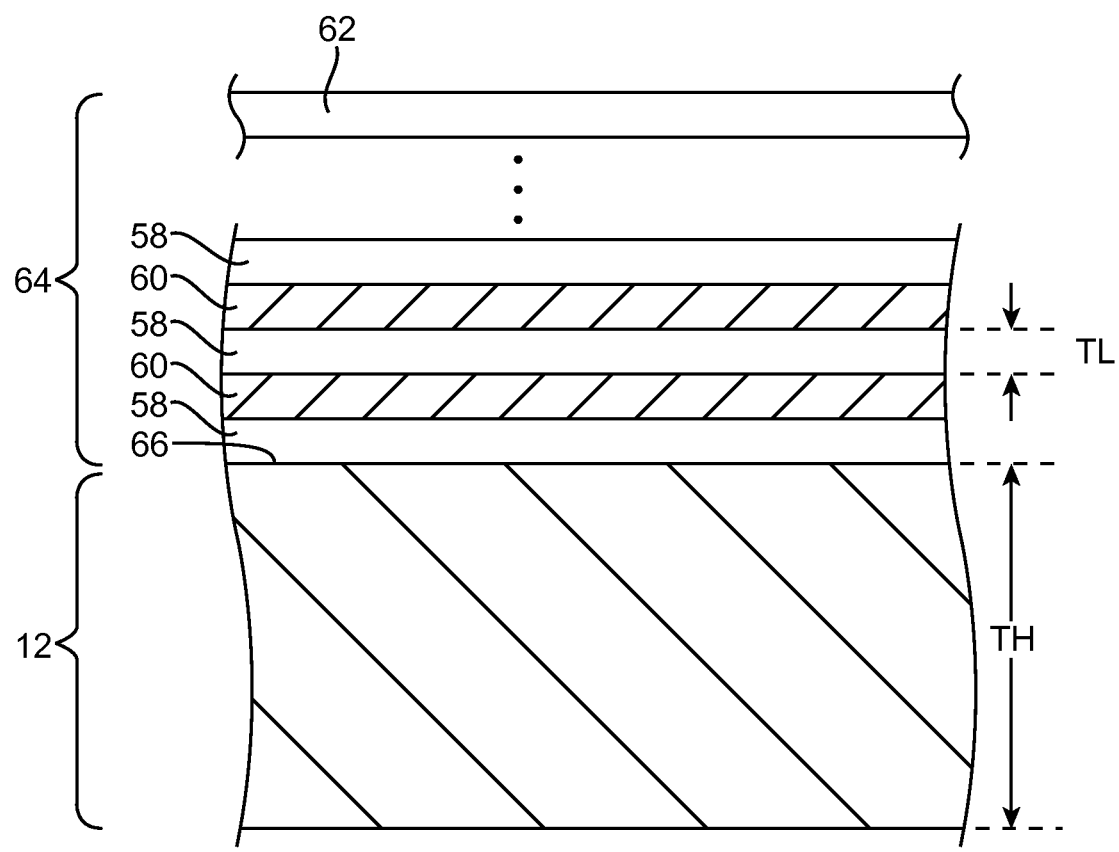
FIG. 6 is a cross-sectional side view of a portion of an electronic device housing on which interconnect layers have been formed in accordance with an embodiment.

FIG. 6 is a cross-sectional side view of an illustrative configuration that may be used for forming signal paths on housing 12. Housing 12 may be formed from a material such as plastic, metal, carbon-fiber composite material or other fiber-based composites, or other materials. Examples in which housing 12 is formed from metal are sometimes described herein as an example. This is, however, merely illustrative. Housing 12 may be formed from any suitable material or materials, As shown in FIG. 6, interconnect stack 64 may be formed directly on interior surface 66 of housing 12. Interconnect stack 64 may include a lowermost layer such as a layer of polyimide or other insulator (e.g., a polymer layer) that insulates signal lines in stack 64 from housing 12 (e.g., in configurations in which housing 12 is formed from metal). Conductive layers 60 such as metal layers and insulating layers such as polymer layers 58 may be stacked in an alternating fashion on surface 66. The uppermost layer of stack 64 (see, e.g., layer 62 of FIG. 6) may be formed from an insulating material (e.g., a dielectric such as polyimide or other polymer layer) or a metal layers (e.g., aluminum, copper, gold, other metals, a metal layer formed from two or more metal sublayers and/or metal alloys, etc.). If desired, the outermost layer of stack 64 (i.e., layer 62) may be formed from a blanket metal layer to provide electromagnetic shielding (as an example). Metal layers 60 (sometimes referred to as metal traces) may be patterned to form signal lines and/or vias that couple signal lines in respective metal layers together.

Layers 58 and 60 have thicknesses (TL) that are typically significantly smaller than thickness TH of housing 12. For example, housing walls may have a thickness on the order of 0.5-3 mm, whereas layer thickness TL for the layers in stack 64 may be 0.1-100 microns (as an example). If desired, other thickness values may be used for layers 58 and 60 (e.g., more than 10 microns or less than 10 microns as examples) and for housing 12 (e.g., more than 1 mm or less than 1 mm as examples). The use of housings thicknesses of 0.5-3 mm and interconnect stack thickness values of 0.1-100 microns is merely illustrative.

Figure 7:
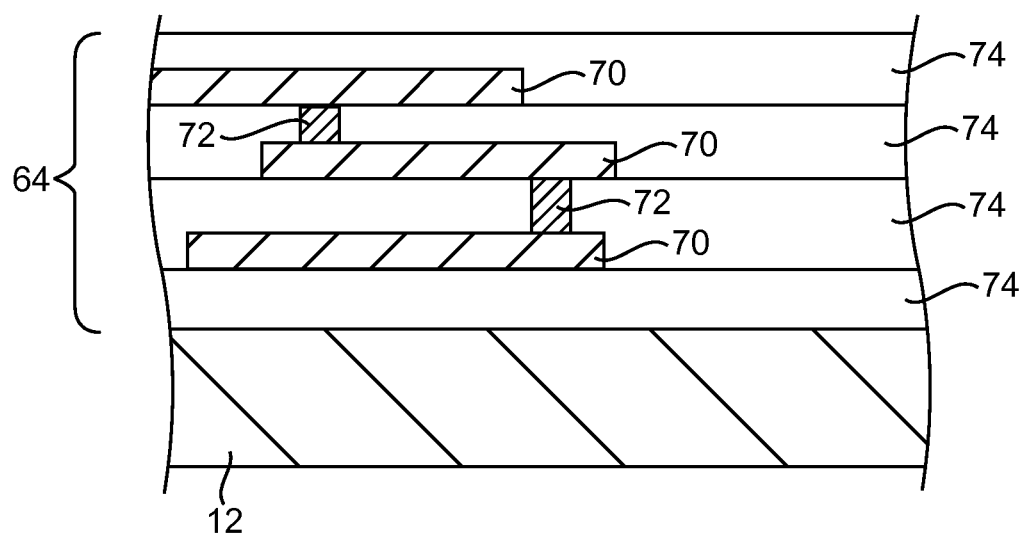
FIG. 7 is a cross-sectional side view of a portion of an electronic device housing on which interconnects that include vias and patterned signals lines have been formed in an electronic device housing in accordance with an embodiment.

As shown in the cross-sectional side view of FIG. 7, interconnect stack 64 may include patterned metal structures that form horizontally extending signal lines 70 that are interconnected by vertically extending structures such as vias 72. Dielectric 74 may be used to electrically isolate respective signal paths formed from structures (metal traces) such as signal lines 70 and vias 72.

Figure 8:
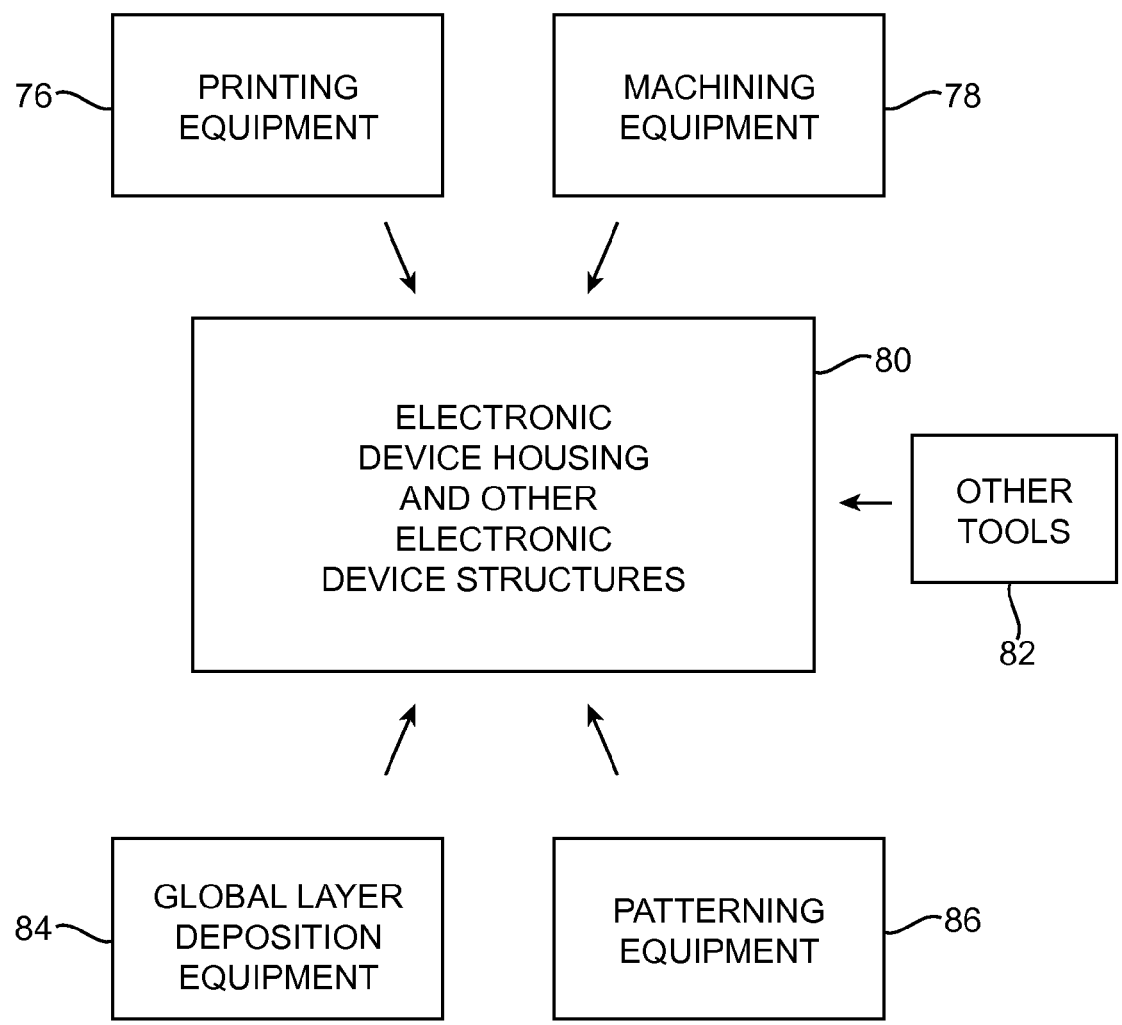
FIG. 8 is a diagram of system equipment that may be used in forming electronic devices having interconnects based on housing structures, fasteners, and other structures in accordance with an embodiment.

FIG. 8 is a diagram of equipment that may be used in forming device 10 and signal paths for device 10. The equipment of FIG. 8 may be used in forming device housing 12, interconnect stack 64, components mounted on printed circuits such as components 48 on printed circuits 46, coupling structures that couple components 48 using metal traces in stack 64 and other signal paths in device 10, and other electronic device structures 80. The equipment of FIG. 8 may include printing equipment 76. Printing equipment 76 may include ink-jet printing equipment, pad printing equipment, screen printing equipment, and other equipment for printing blanket layers and/or patterned layers of material. Examples of structures that may be formed using equipment 76 include printed layers of dielectric, strips of dielectric, metal lines (e.g., lines formed from metallic paint or other liquid conductive material), blanket layers of metal, etc. Machining equipment 78 may be used to machine grooves and other structures into housing 12 (e.g., to form grooves in a metal housing). Global deposition equipment 84 may include equipment for depositing layers of material by blanket spray coating, by spinning, by physical vapor deposition, or other deposition techniques. Patterning equipment 86 may be used to pattern layers of material such as blanket layers of metal and/or dielectric. Equipment 86 may include photolithographic equipment such as photoresist deposition and patterning equipment, etching equipment, etc. If desired, other tools 82 may be used in processing electronic device structures 80 such as lasers for cutting grooves that penetrate partway or entirely through a housing wall or other portion of housing 12, water jet cutting equipment, plasma cutting equipment, heating equipment, and other equipment for depositing, patterning, processing, and removing layers of dielectric and metal for structures 80.

Figure 9:
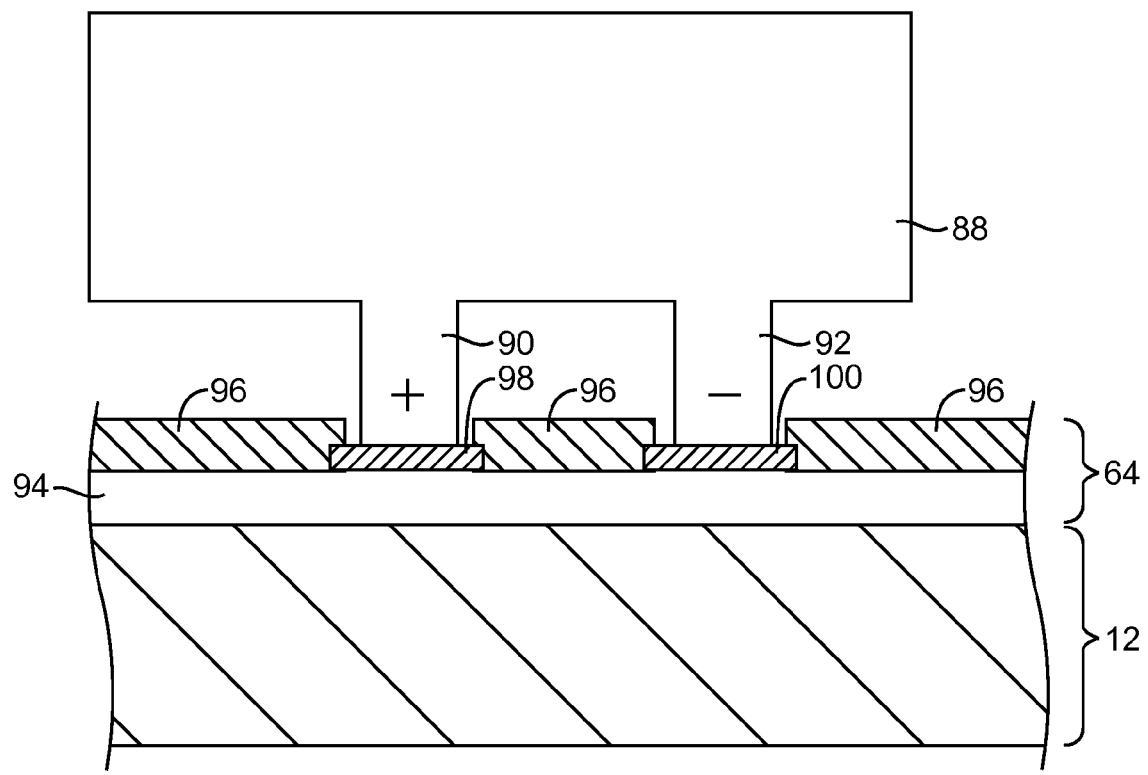
FIG. 9 is a side view of a portion of an electronic device housing showing how housing-based interconnects may be mated with corresponding spring contacts on a battery or other electrical component in accordance with an embodiment.

Metal signal lines on housing 12 may be used to route analog signals and/or digital signals between electrical components in device 10. If desired, metal signal lines on housing 12 may be used to route power. In the illustrative configuration of FIG. 9, signals such as power supply signals are being applied to metal traces 98 and 100 in interconnect stack 64 on housing 12 from component 88. Component 88 may be an electrical component such as a battery (as an example). Battery 88 may have a positive terminal such as terminal 90 and a ground terminal such as ground terminal 92. Terminals 90 and 92 may be formed from springs that protrude downwards out of battery 88 to make electrical connections with respective contacts (metal traces in stack 64) such as contacts 98 and 100. Contact 98 may be part of a metal trace that forms a positive power supply line in interconnect stack 64. Contact 100 may be part of a metal trace that forms a ground power supply line in interconnect stack 64. Dielectric layer 94 may be a polymer or inorganic layer that insulates metal housing 12 from traces 98 and 100. If desired, ground power supply line 100 may be shorted to housing 12. Upper dielectric layer 96 may be formed on the metal traces and underlying dielectric layers of stack 64 and may have openings to accommodate springs 90 and 92.

Figure 10:
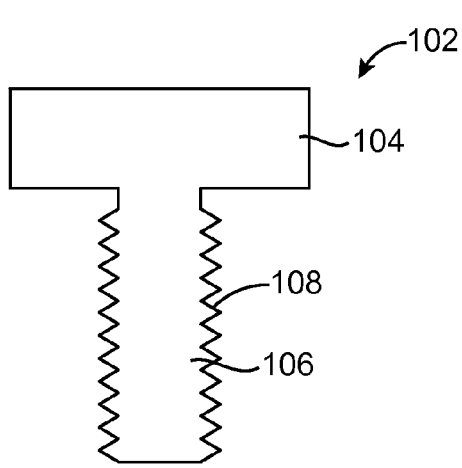
FIG. 10 is a cross-sectional side view of a solid screw in accordance with an embodiment.

Coupling structures such as screws and other fasteners may be used to route signals between electrical components and housing-based interconnects. FIG. 10 shows how a fastener such as a solid screw may be used in forming a coupling structure in device 10. As shown in the cross-sectional side view of FIG. 10, screw 102 may have a head such as head 104 and a shaft such as shaft 106. Shaft 106 may have threads 108. Shaft and head 104 may be formed from metal or other conductive material. This allows screw 102 to conduct electrical signals between housing-based interconnects and components in device 10.

Figure 11:
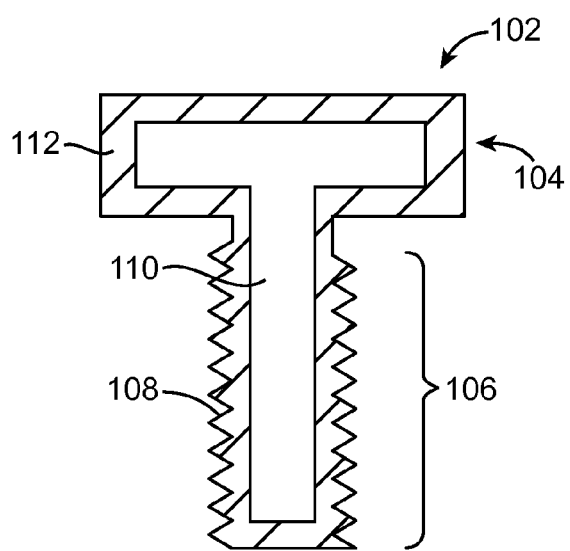
FIG. 11 is a cross-sectional side view of an illustrative screw with a core and a coating formed of different materials in accordance with an embodiment.

FIG. 11 is a cross-sectional side view of an illustrative screw that has a core surrounded by a coating. Core 110 may be formed from a conductive material such as metal (e.g., copper). Coating 112 may be formed from another conductive material such as a different metal (e.g., stainless steel, nickel, etc.). Configurations in which core 110 and coating 112 are respectively formed from a metal and a dielectric or are respectively formed from a dielectric and a metal may also be used in device 10.

Figure 12:
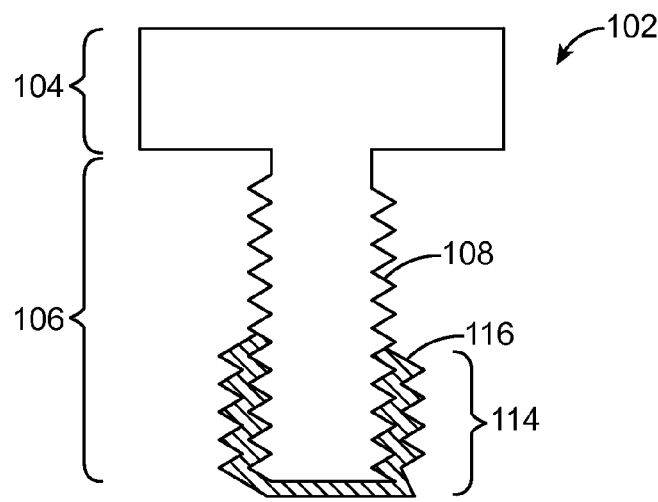
FIG. 12 is a cross-sectional side view of an illustrative screw having a coating such as an insulating coating over a portion of a shaft of the screw in accordance with an embodiment.

In the illustrative configuration of FIG. 12, screw 102 has been provided with a coating such as coating 116 that covers threads 108 in tip portion 114 of shaft 106, while leaving remaining portions of shaft 106 uncovered. Head 104 and shaft 106 may be formed from metal. Coating 116 may be formed from a dielectric material to insulate tip 114 of shaft 106.

Figure 13:
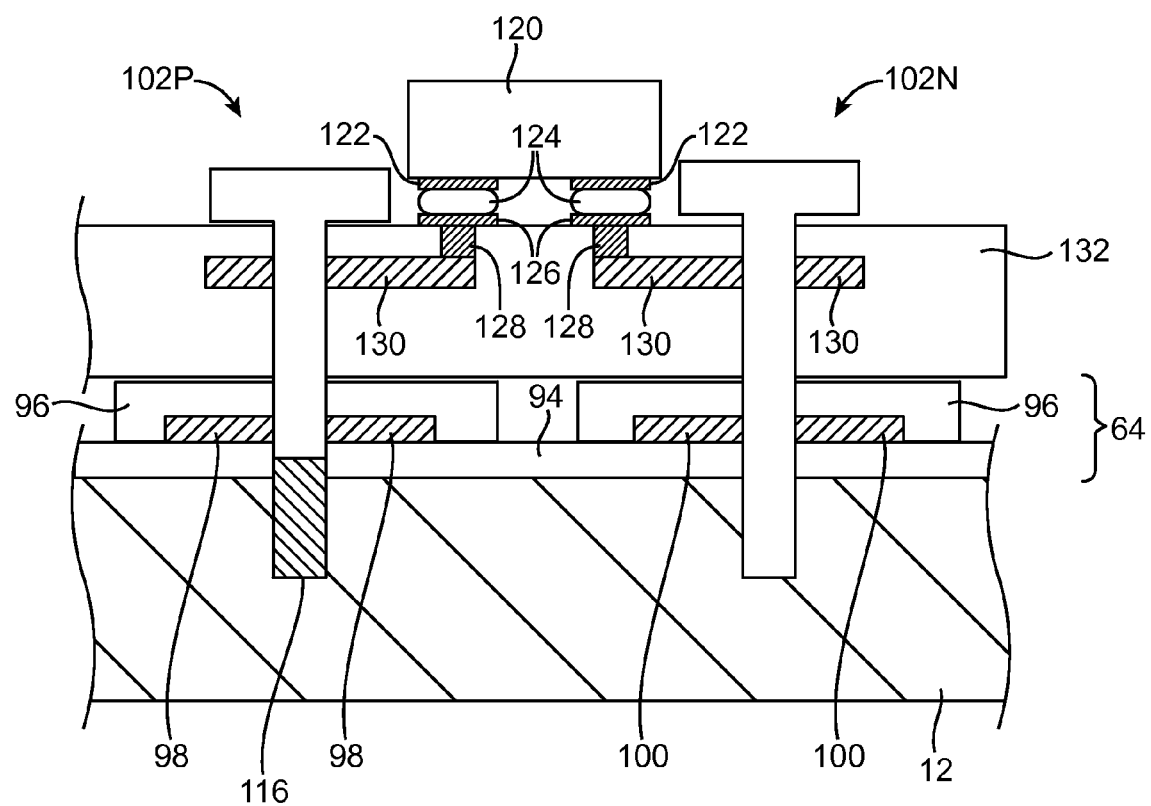
FIG. 13 is a cross-sectional side view of an illustrative housing with signal lines coupled to traces on a printed circuit via respective screws in accordance with an embodiment.

FIG. 13 is a cross-sectional side view of a portion of device 10 in which an integrated circuit has been coupled to signal lines on housing 12 using coupling structures such as a pair of metal screws. As shown in FIG. 13, interconnect stack 64 may be formed directly on the inner surface of housing 12. Interconnect stack 64 may include metal traces for forming signal paths such as metal traces 98 and 100. Dielectric 94 and 96 may be used to prevent traces 98 and 100 from shorting to each other and other metal structures in device 10.

Substrate 132 may be a printed circuit such as a rigid printed circuit board or a flexible printed circuit or may be another substrate that contains metal traces for conveying signals between component 120 and other components in device 10. Component 120 may be an integrated circuit or other electrical component. Component 120 may have contacts such as illustrative metal contacts (terminals) 122. Solder 124 may be used to mount component 120 to printed circuit 132. In particular, solder 124 may be used to form solder joints between contacts 122 on component 120 and mating contacts 122 on the surface of printed circuit 132. Component 120 may be a power management unit or any other electrical component. Metal traces in printed circuit 132 may be used in forming signal paths for routing signals to and from terminals 122 of component 120. These metal traces may include vias such as vias 128 and horizontal signal lines such as signal lines 130.

Screws 102P and 102N may serve as coupling structures that couple the signal paths of printed circuit 132 to the signal paths of interconnect stack 64 on housing 12. Screw 102N may be a metal screw that routes signals between a first metal line 130 on printed circuit 132 and metal trace 100 on housing 12. The tip of the shaft of screw 102N may be formed from bare metal that forms an electrical connection with housing (e.g., a metal housing having a threaded opening that receives the exposed metal threads of the shaft of screw 102N). Screw 102P may be a metal screw with an insulated tip (i.e., a shaft tip coated with insulator 116). The shaft of screw 102P may be used to route signals between a second metal line 130 on printed circuit 132 and metal trace 98 on housing 12. Because the tip of the shaft of screw 102P is coated with dielectric, the metal of the shaft of screw 102P does not form a short circuit to housing 12 (in this example). The shaft of screw 102P does, however, short the second metal trace 130 in printed circuit 132 to metal trace 98 on housing 12. With one suitable arrangement, component 120 is a power management unit, battery, or other power component. A first signal path is formed from a first contact for component 120 to first metal trace 98 in interconnect stack 64 on housing 12 through one of contacts 122, solder joint 124, one of contacts 126, one of vias 128, one of metal lines 130, and screw 102P. A second signal path is formed from a first contact for component 120 to second metal trace 100 in interconnect stack 64 on housing 12 through one of contacts 122, solder joint 124, one of contacts 126, one of vias 128, one of metal lines 130, and screw 102N. Metal line 98 may convey a positive power supply voltage or other signal on metal line 98 to other electrical components in device 10. Metal line 100 may convey a ground power supply voltage or other signal on metal line 100 to other electrical components in device 10.

Figure 14:
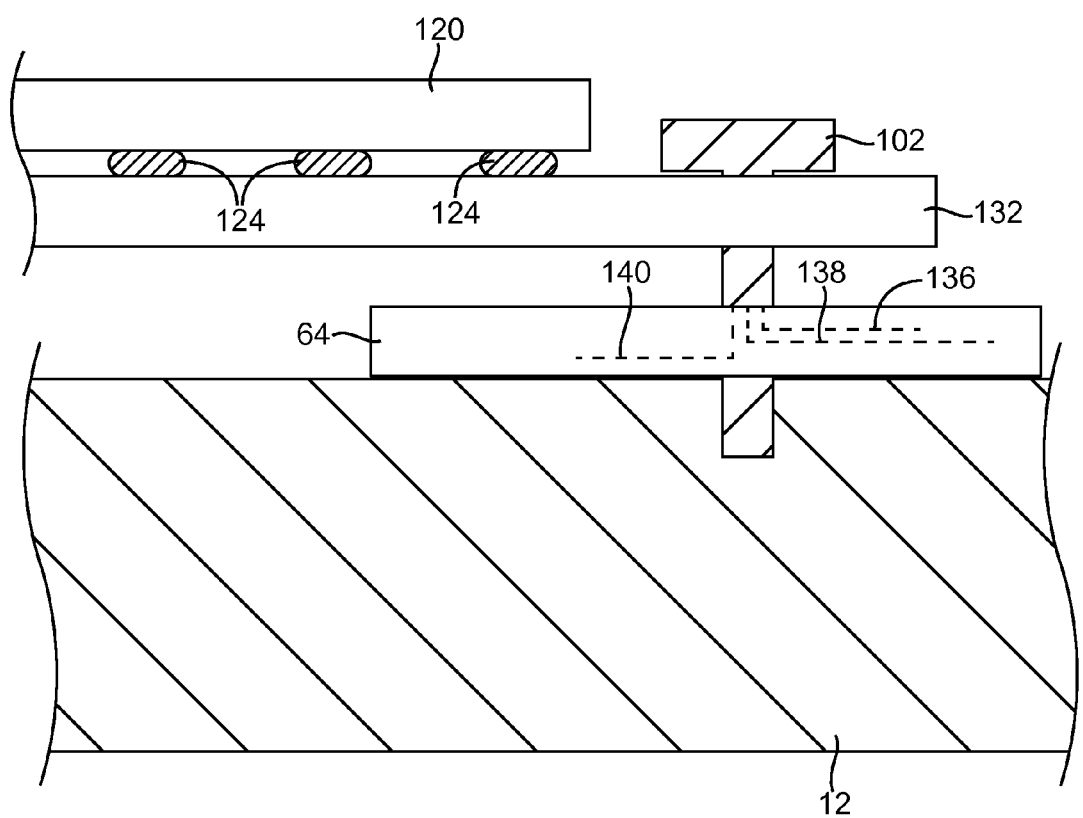
FIG. 14 is a cross-sectional side view of a portion of a printed circuit board and a component mounted to the printed circuit board showing how a screw with multiple signals paths may be used to couple the component and printed circuit to signal lines on an electronic device housing in accordance with an embodiment.

In some situation, it may be desirable for a screw, other fastener, or other coupling structure in device 10 to carry more than one signal. This type of arrangement is shown in FIG. 14. As shown in FIG. 14, electrical component 120 may be mounted on printed circuit 132 using solder 124. Component 120 may have two or more contacts, three or more contacts (as shown in FIG. 14), or four or more contacts. Printed circuit 132 and screw 102 may have a corresponding number of signal paths. For example, if component 120 has three terminals that produce three separate signals, printed circuit 132 may have three corresponding signal paths for routing signals between component 120 and screw 102, whereas screw 102 may have three corresponding signal paths for routing signals between printed circuit 132 and interconnect stack 64 on housing 12. Interconnect stack may have three signal paths (in this example) such as signal paths 136, 138, and 140, each of which mates with a respective signal path in screw 102.

Figure 15:
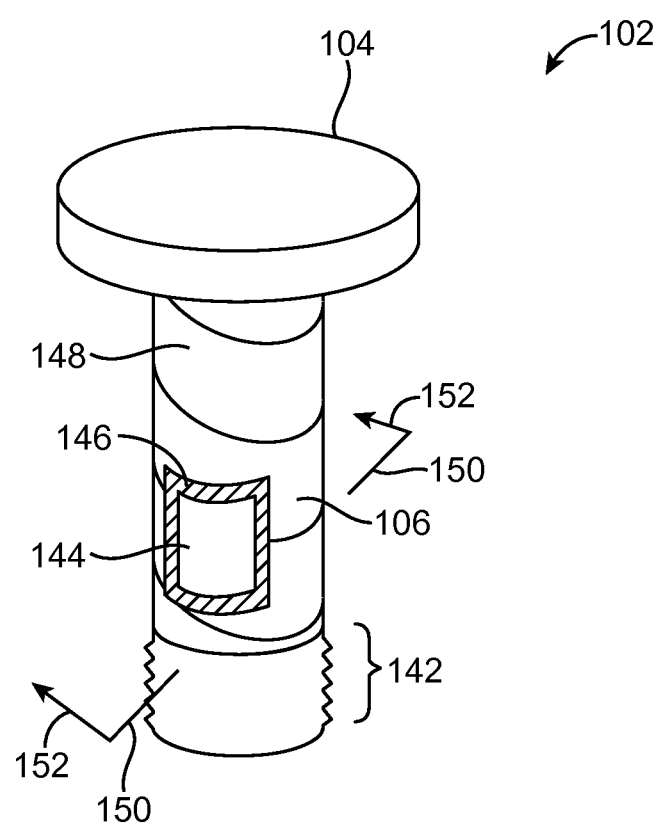
FIG. 15 is a perspective view of an illustrative screw that includes two independent signal paths in accordance with an embodiment.

Coupling structures such as screw 102 may have segmented shafts or other structures that allow the screw or other coupling structure to carry multiple signals in parallel independently. A perspective view of an illustrative screw that has two independent signal paths is shown in FIG. 15. As shown in FIG. 15, screw 102 may have a first signal path that leads between upper shaft portion 148 of shaft 106 to tip portion 142 of shaft 106 and may have a second parallel and independent path that leads between screw head 104 and side terminal 144 through a metal core. Insulating structures such as dielectric ring 146 and associated internal dielectric structures may prevent the first and second paths from becoming shorted to each other.

Figure 16:
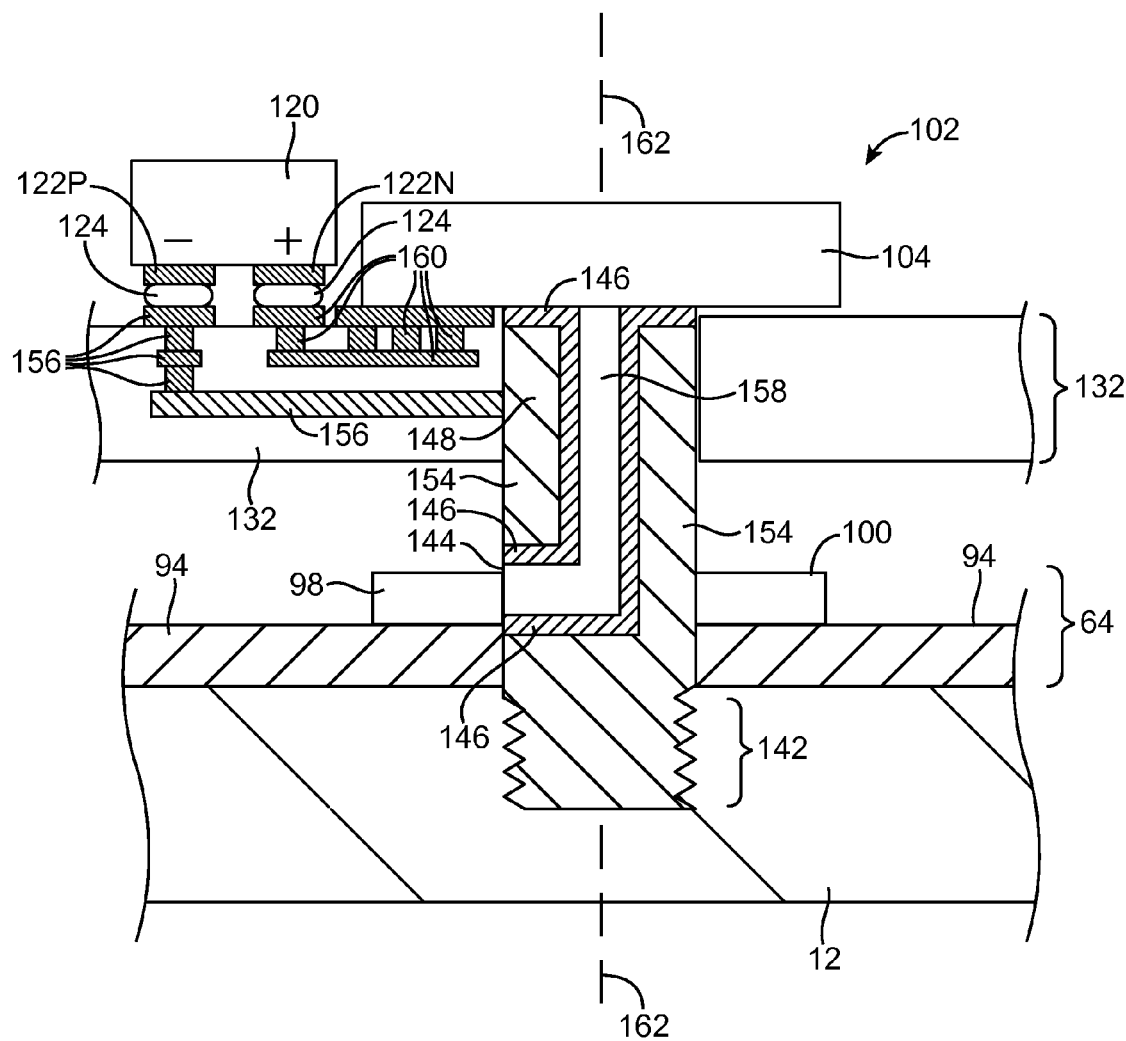
FIG. 16 is a cross-sectional side view of an illustrative printed circuit that has been coupled to signal paths on an electronic device housing using a screw of the type shown in FIG. 15 in accordance with an embodiment.

A cross-sectional side view of two-path screw 102 of FIG. 15 taken along line 150 and viewed in direction 152 is shown in FIG. 16. In the example of FIG. 16, component 120 is mounted to printed circuit 132 with solder 124. Component 120 has a first contact such as contact 122P and a second contact such as contact 122N (in this example). Metal screw 102 has two parallel signal paths. The first signal path is formed through metal head 104, metal core 158, which extends along longitudinal axis 162 of screw 102, and side terminal 144. Dielectric 146 electrically isolates the first signal path from the second signal path. The second signal path through screw 102 is formed by upper shaft portion 148, middle shaft portion 154 (which is connected to portion 148 out of the plane of FIG. 16), and lower (tip) shaft portion 142. Tip 142 can be free of dielectric (if desired) to short tip 142 to metal housing 12 (as an example).

Using the two paths formed through screw 102, a coupling structure such as screw 102 can carry electrical signals between component 120 and traces such as traces 98 and 100 in interconnect stack 64 on housing 12. A first signal path (e.g., a positive power supply voltage path or other signal path) involves contact 122N, solder 124, metal traces 160 on printed circuit 132, head 104, shaft core 158, terminal portion 144, and metal trace 98, which is in contact with terminal portion 144 of the first path. A second signal path (e.g., a ground power supply voltage path or other signal path) involves contact 122P, solder 124, metal traces 156 on printed circuit 132, upper shaft portion 148, middle shaft portion 154, and metal trace 100, which contacts middle portion 154 of screw 102. The tip of screw 102 may be screwed into a threaded opening in housing 12 and may, if desired, form an additional portion of the second path (e.g., shorting portion 154 to housing 12, which may serve as a ground).

Figure 17:
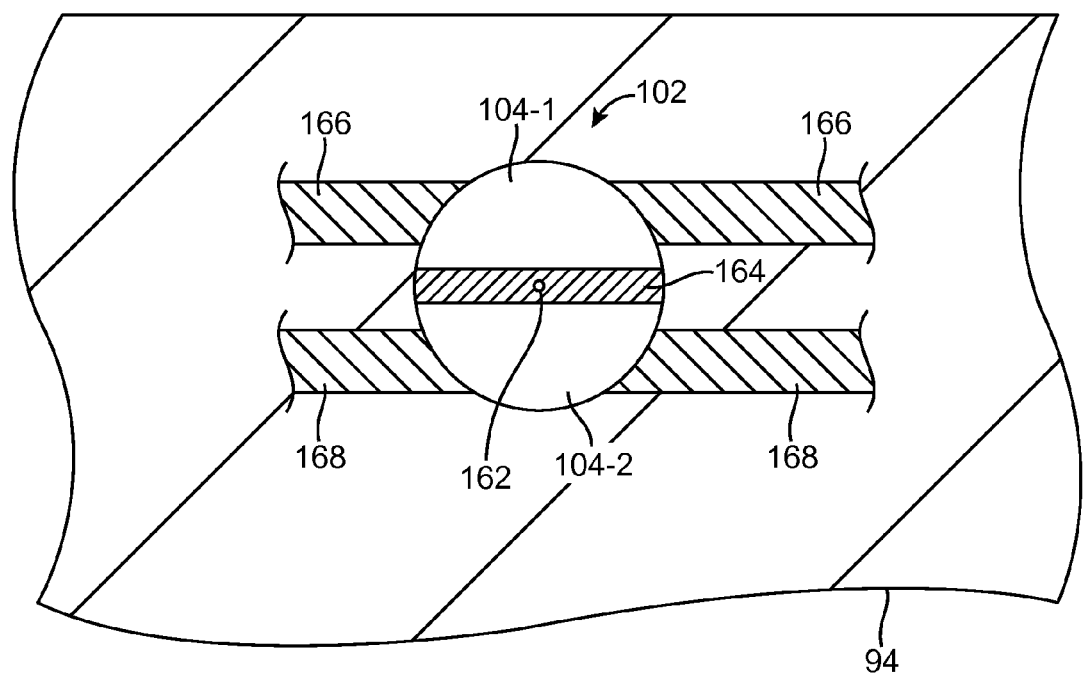
FIG. 17 is a top view of an illustrative screw that has been segmented to form two parallel independent signal paths in accordance with an embodiment.

If desired, a screw, other fastener, or other coupling structure may be segmented to form two parallel paths that run along the longitudinal axis of the screw or other structure. A top view of an illustrative radially segmented screw of this type is shown in FIG. 17. As shown in FIG. 17, screw 102 may have a first signal path formed from a portion of head 104 such as head portion 104-1 and may have a second signal path formed from a portion of head 104 such as head portion 104-2. The shaft under the head may be similarly segmented. Dielectric 164 may separate portions 104-1 and 104-2 from each other and may separate the two shaft portions under head 104 from each other. Dielectric 164 and the signal paths formed from portions 104-1 and 104-2 of screw 102 may extend longitudinally along longitudinal axis 162 of screw 102 (i.e., the two parallel signal paths supported by illustrative screw 102 of FIG. 17 may run into the page of FIG. 17). In the FIG. 17 example, the paths of screw 102 are coupled to respective signal lines 166 and 168 on dielectric layer 94 in an interconnect stack 64 formed on housing 12. The paths of screw 102 may also be coupled to respective traces in a printed circuit, as described in connection with the paths of screw 102 of FIG. 16.

It may be desirable to use spring-loaded pins to form signal paths. Spring-loaded pins may be formed from metal structures having a body and a spring-loaded pin shaft that moves within the body. If desired, spring-loaded pins may be segmented to carry multiple parallel signals in device 10. Consider, as an example, the scenario of FIG. 18. In the illustrative arrangement of FIG. 18, spring loaded pin 172 has body 174 and shaft (pin) 176. Spring 186 presses shaft 176 outward away from body 174 into an opening in interconnect stack 64 on housing 12 (or an opening in a segmented screw or other coupling structure, etc.).

Figure 18:
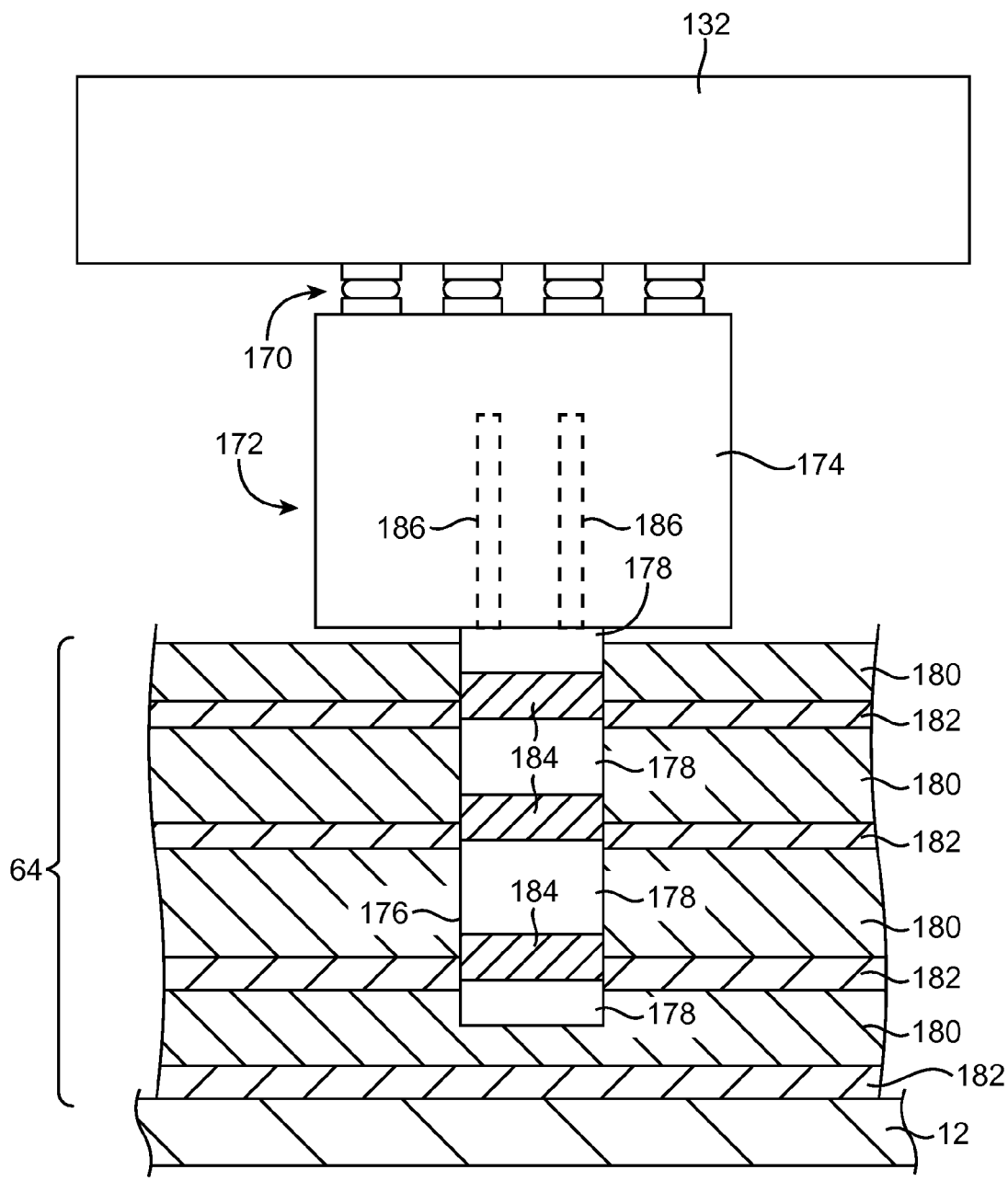
FIG. 18 is a cross-sectional side view of an illustrative spring-loaded pin that is being used to interconnect a printed circuit to signal paths on an electronic device housing in accordance with an embodiment.

Spring loaded pin 172 in the example of FIG. 18 has four parallel signal paths. Connections 170, which may be formed from electrical contacts and solder joints, may be used to connect the four signal paths of pin 172 to four respective metal traces in printed circuit 132 or four conductive portions of a screw or other coupling structure. On shaft 176, dielectric structures 184 segment shaft 176 into four respective shaft terminals 178. Shaft terminals 178 are coupled to respective contacts 170 for spring-loaded pin 172 using signal paths in body 174. Shaft terminals 178 mate with corresponding metal traces 180 in interconnect stack 64 (or with mating signal paths in a coupling structure, etc.). Dielectric layers 182 separate metal traces 180 and prevent the signal paths of interconnect stack 64 from being shorted to one another. In the illustrative configuration of FIG. 18, spring-loaded pin 172 has four terminals 178 and has four corresponding parallel signal paths coupled to connections 170. If desired, a spring-loaded pin or other coupling structure may have a single signal path, two parallel signal paths, more than two parallel signal paths, three or more parallel signal paths, four or more parallel signal paths, etc.

Figure 19:
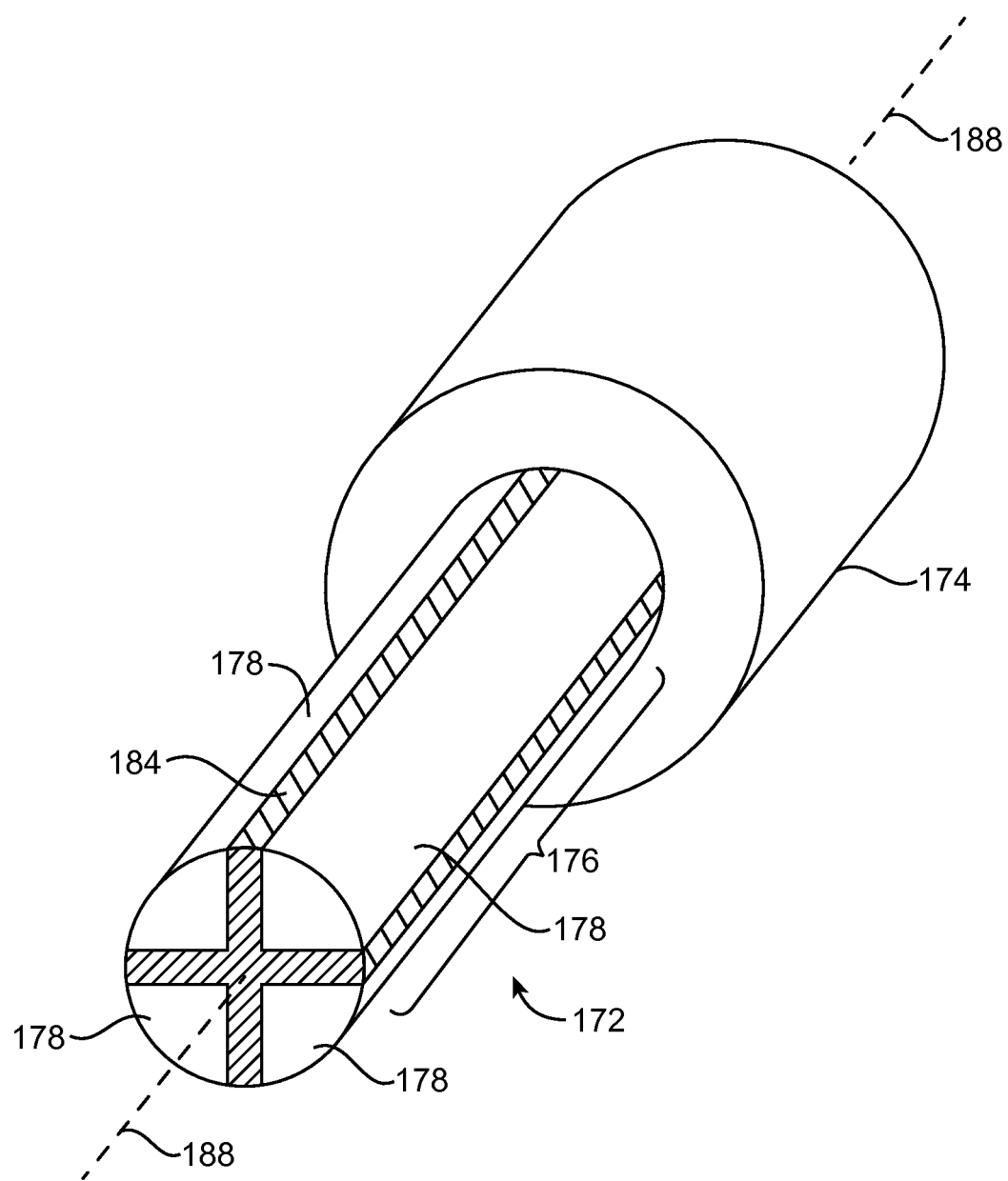
FIG. 19 is a perspective view of an illustrative spring-loaded pin that has four signal paths running along its length in accordance with an embodiment.

In the illustrative configuration of FIG. 19, spring-loaded pin 172 has a longitudinal axis such as longitudinal axis 188. Shaft 176 is pressed outwardly away from body 174 by a spring in body 174. Shaft 176 has dielectric structures 184 that run parallel to axis 188 and that segment shaft 176 into four longitudinally extending terminals 178. Each of terminals 178 can mate with a respective metal trace in interconnect stack 64 on housing 12 or other conductive paths in device 10.

Figure 20:
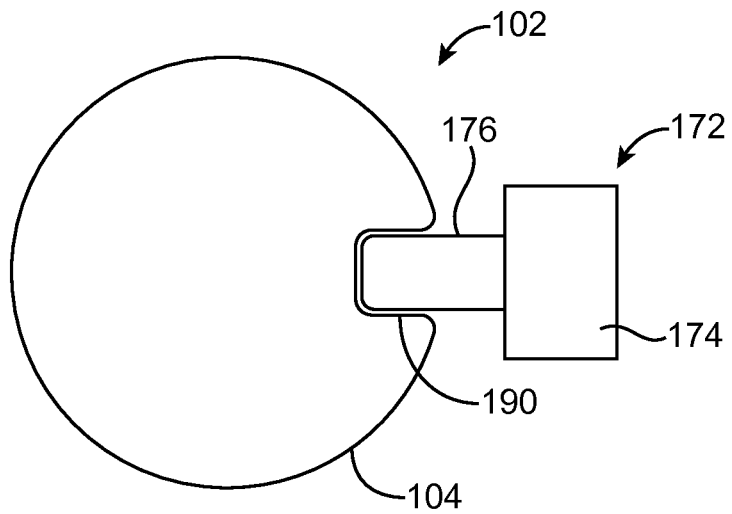
FIG. 20 is a top view of an illustrative spring-loaded pin that is engaging a notch in a structure such as a screw in accordance with an embodiment.

If desired, spring-loaded pins can form part of a coupling structure that includes a fastener such as a screw. FIG. 20 is a top view of an illustrative screw 102 that is coupled to spring loaded-pin 172. As shown in FIG. 20, screw head 104 of screw 102 has a notch such as notch 190 that receives shaft 176 of spring loaded pin 172. Screw 102 and spring-loaded pin 176 may be formed of metal to form a signal path between interconnect stack 64 and other structures in device 10 such as printed circuit boards and components mounted to the printed circuit boards.

Figure 21:
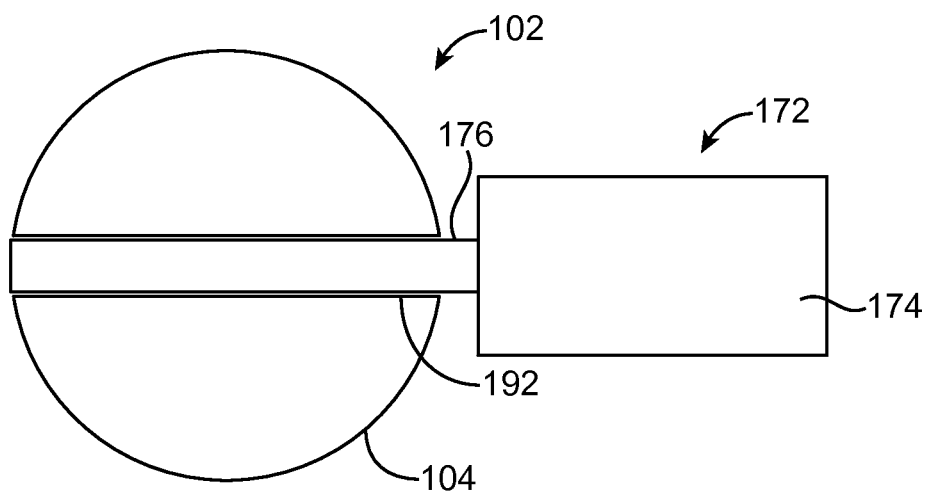
FIG. 21 is a top view of an illustrative spring-loaded pin that is passing through a hole in a structure such as a screw in accordance with an embodiment.

In the example of FIG. 21, screw head 104 has a hole such as hole 192 that passes entirely through head 192. Shaft 176 of spring-loaded pin 172 is received within hole 192. spring-loaded pin. If desired, shaft 176 may have multiple segments that are coupled to multiple corresponding signal paths in screw 102.

Figure 22:
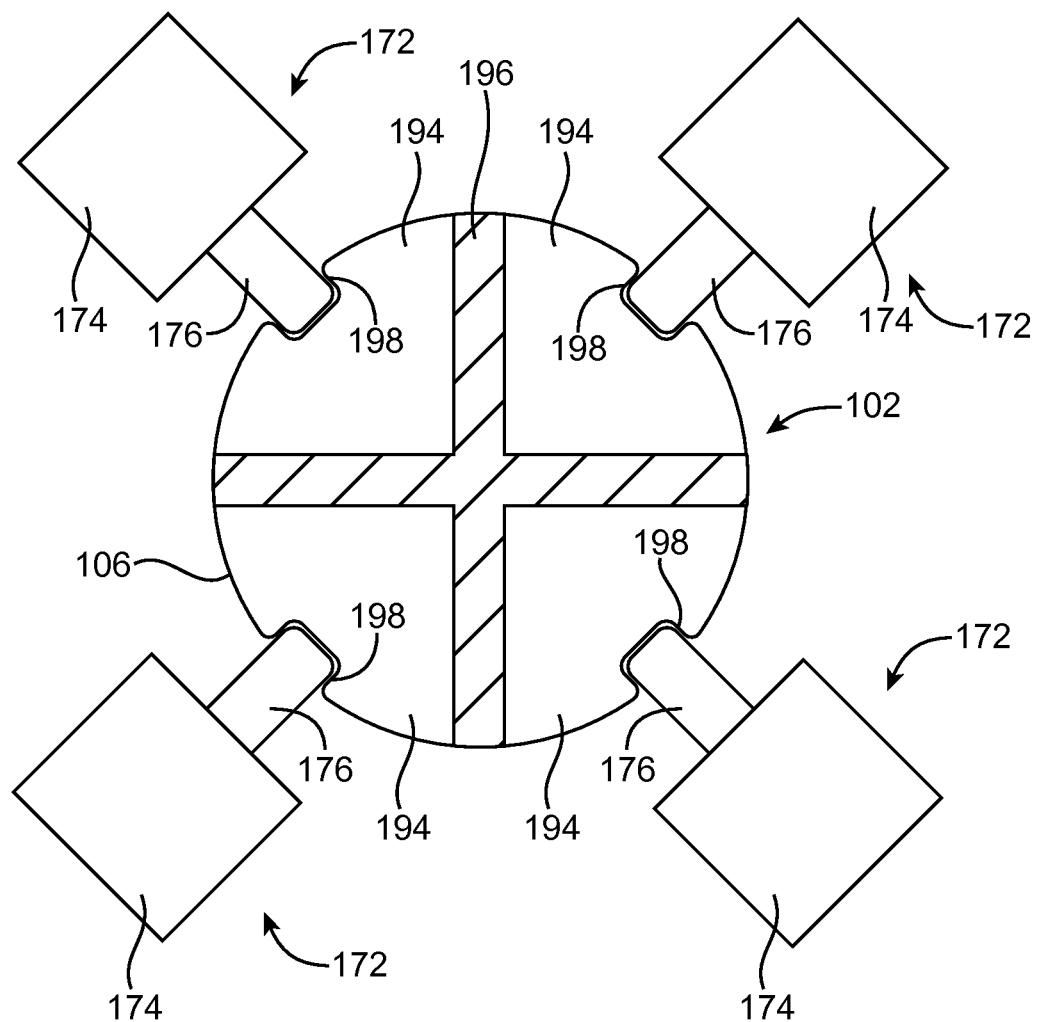
FIG. 22 is a top view of an illustrative segmented structure such as a segmented screw that has four portions each of which has a notch that receives a respective shaft of a spring-loaded pin in accordance with an embodiment.

FIG. 22 is a cross-sectional top view of a screw with multiple signal paths each of which is coupled to a respective spring-loaded pin 172. As shown in FIG. 22, screw 102 has dielectric 196 that divides screw shaft 106 into multiple longitudinally-extending segments 194. Each segment 194 serves as a separate signal path. Segments 194 may each have a respective notch 198 to receive a respective shaft 176 of a spring-loaded pin 172.

Figure 23:
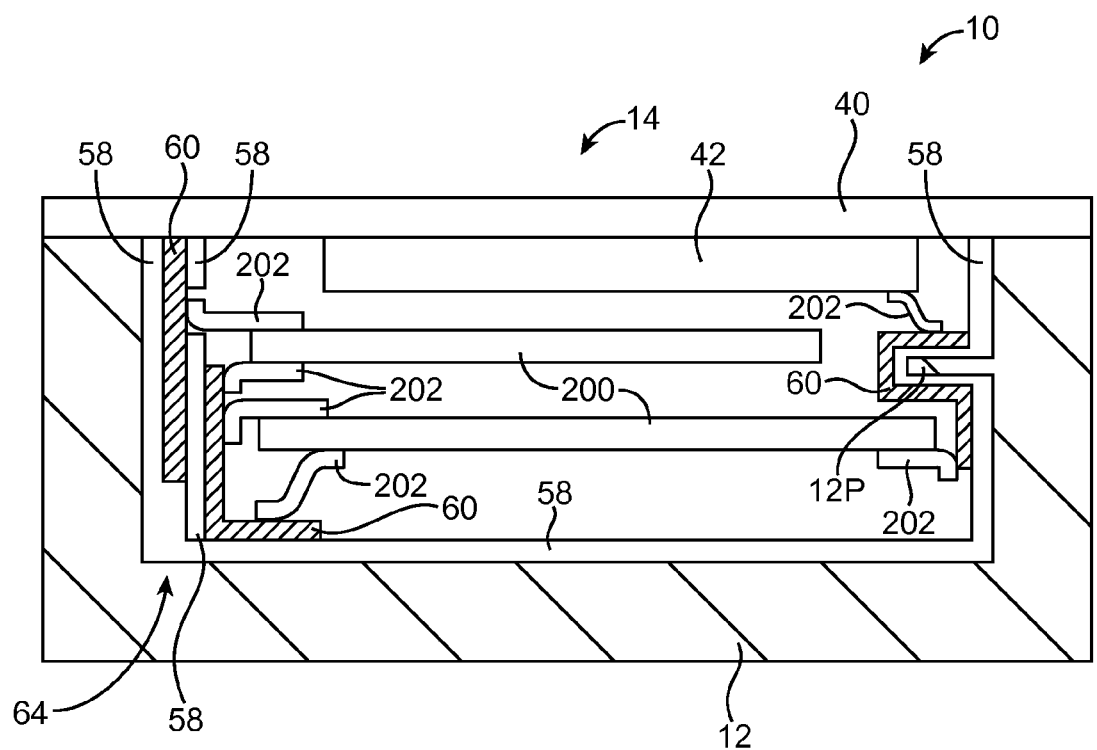
FIG. 23 is a cross-sectional side view of an illustrative electronic device in which printed circuits and other structures have been coupled to signal paths on a housing of the electronic device using springs in accordance with an embodiment.

Coupling structures for device 10 may, if desired, be formed using springs. A cross-sectional side view of an illustrative device that uses springs as coupling structures that couple together signal paths in interconnect stack 64 on housing 12 and electrical components in device 10 is shown in FIG. 23. As shown in FIG. 23, device 10 may have a display such as display 14 that includes display module 42 mounted under display cover layer 40. Electrical components 200 may be mounted within the interior of housing 12. Components 200 may be, for example, a battery, one or more printed circuit boards populated with integrated circuits and other electrical components, buttons, connectors, sensors, audio components, and other input-output circuitry and control circuitry. Interconnect stack 64 may be formed from layers of dielectric 58 and metal traces 60 on the inner surface of housing 12 and may, if desired, include bends that follow bends in the inner surface of housing 12 (e.g., right-angle bends or other bends). Housing 12 may have protruding portions such as portions 12P that serve as a support structure for dielectric 58 and traces 60.

Metal springs 202 may serve as coupling structures that interconnect components 200, components such as display 14 (e.g., display module 42), and signal paths in interconnects 64. Springs 202 may be formed from spring metal or other suitable metal. Solder, welds, conductive adhesive, or other mounting structures may be used to attach springs 202 to traces 60 in stack 64 on housing 12, to metal structures such as housing 12, to contacts on printed circuits boards or other contacts in components 200, etc. Springs 202 may also be screwed into place with screws or mounted to device structures using other fasteners.

Figure 24:
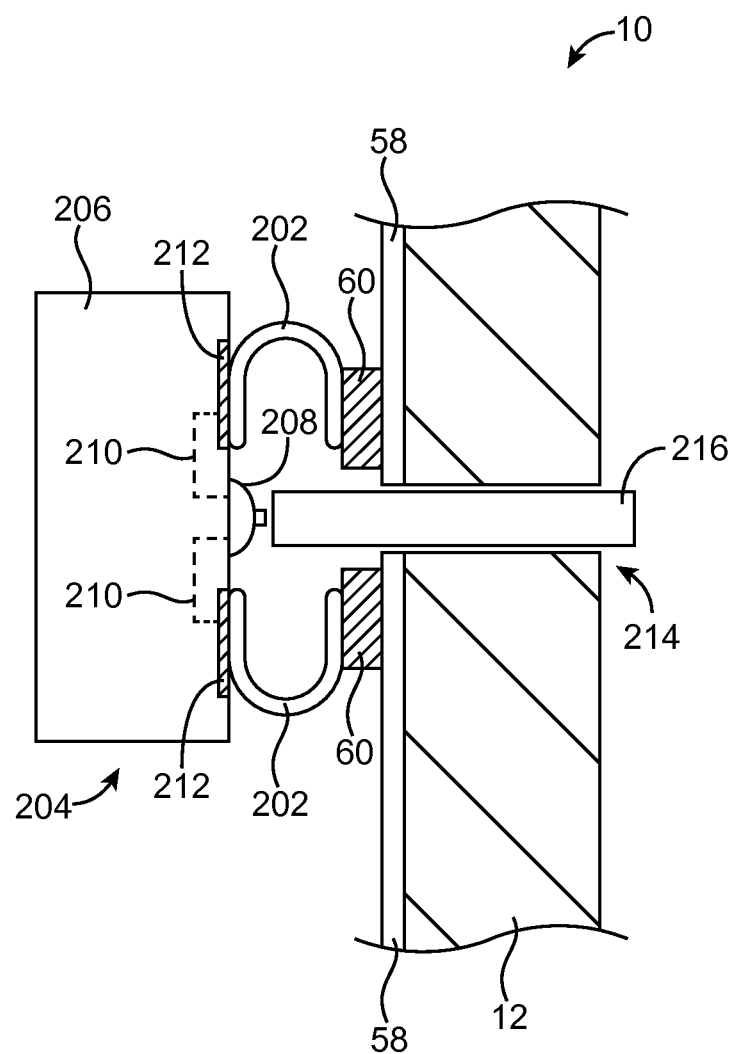
FIG. 24 is a cross-sectional side view of an illustrative electronic device housing with signal paths coupled to a button in accordance with an embodiment.

FIG. 24 is a cross-sectional side view of a portion of device 10 in which a component such as a button has been coupled to metal traces 60 on dielectric layer 58 using springs 202. Button 204 may have a moving button member such as button member 216 that can be pressed by a user's finger from the exterior of device 10. Button member 216 may pass through opening 214 in housing 12. The inner surface of housing 12 may be provided with an interconnect stack formed from dielectric layers such as layer 58 and metal traces such as traces 60. Traces 60 may be used to form signal paths that convey button signals from button 204 to control circuitry in device 10. Springs 202 may be coupled between traces 60 and corresponding contacts 212 on button structure 206. Button structure 206, which may serve as a substrate for routing signals in button 204, may contain signal paths such as signal paths 210 that are coupled between contacts 212 and terminals in a button switch such as switch 208. When button member 216 is pressed inwardly, dome switch 208 is compressed and changes states (from open to closed or from closed to open, depending on the design of dome switch 208). As switch 208 is opened and closed, the resistance between lines 60 will change (e.g., the resistance will change from a high magnitude when switch 208 is open and a near zero magnitude when switch 208 is closed). Control circuitry can monitor the state of button 204 by monitoring the resistance between traces 60.

Figure 25:
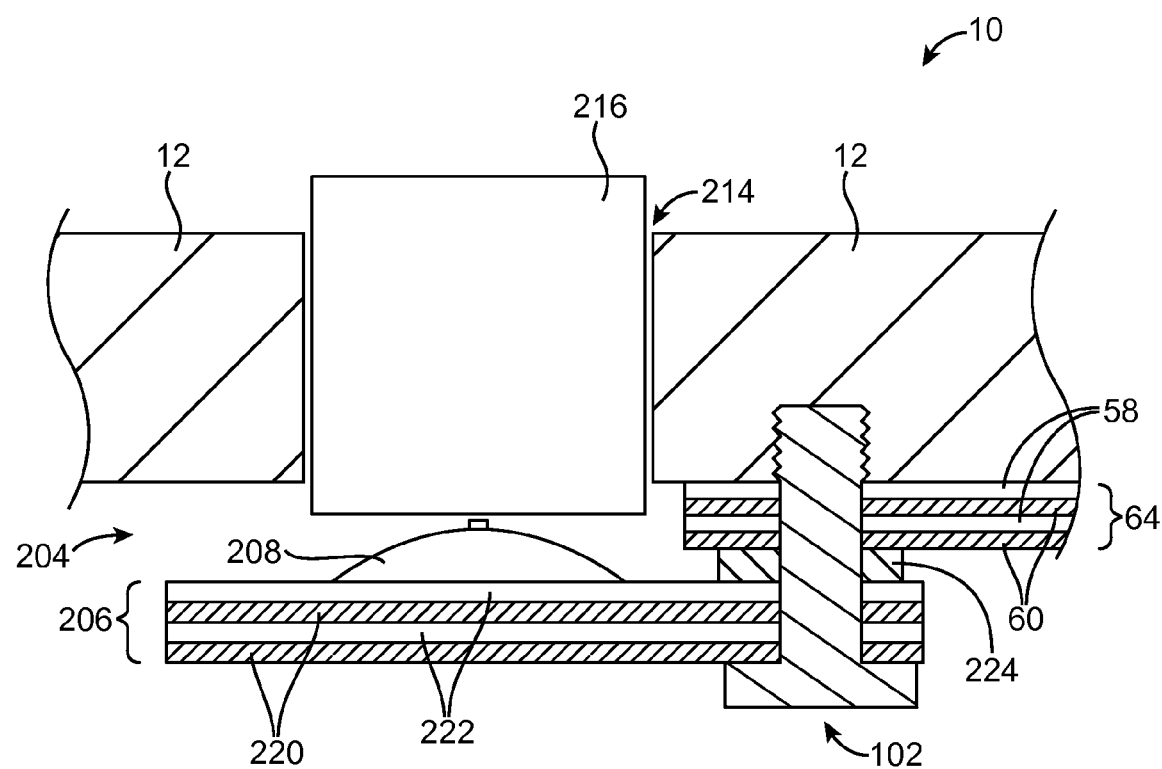
FIG. 25 is a cross-sectional side view of an illustrative button member passing through a housing wall in an electronic device to engage a button switch mounted on a printed circuit that is coupled to signal paths on the housing wall in accordance with an embodiment.

In the illustrative configuration of FIG. 24, button 204 is coupled to housing-based interconnects using a signal path coupling structure formed from springs. If desired, a coupling structure for interconnecting a button with housing-based signal paths may be formed using a screw or other fastener. This type of arrangement is shown in FIG. 25. As shown in FIG. 25, button 204 may include button member 216, which moves within openings 214 of housing 12 and may include a switch such as illustrative dome switch 208, which is compressed by button member 216. Switch 208 may be mounted on printed circuit 206. Printed circuit 206 may contain layers of patterned metal traces such as layers 220 and layers of dielectric 222. The traces in printed circuit 206 form signal paths that couple dome switch terminals of dome switch 208 to corresponding signal paths in screw 102. Screw 102 may, as an example, be a two-path screw of the type described in FIG. 16. The paths in screw 102 may be used to couple the signal paths in printed circuit 206 to signal paths in interconnect stack 64 that are formed from dielectric layers 58 and patterned metal layers 60 on the interior surface of housing 12. Screw 102 may be used to couple a signal path in interconnect stack 64 and/or printed circuit 206 to housing 12, which may serve as a ground, or the tip of screw 102 can be coated with dielectric to prevent signal paths in screw 102 from being shorted to housing 12. Spacers such as illustrative dielectric spacer 224 may be interposed between printed circuit 206 and interconnect stack 64, if desired.

Figure 26:
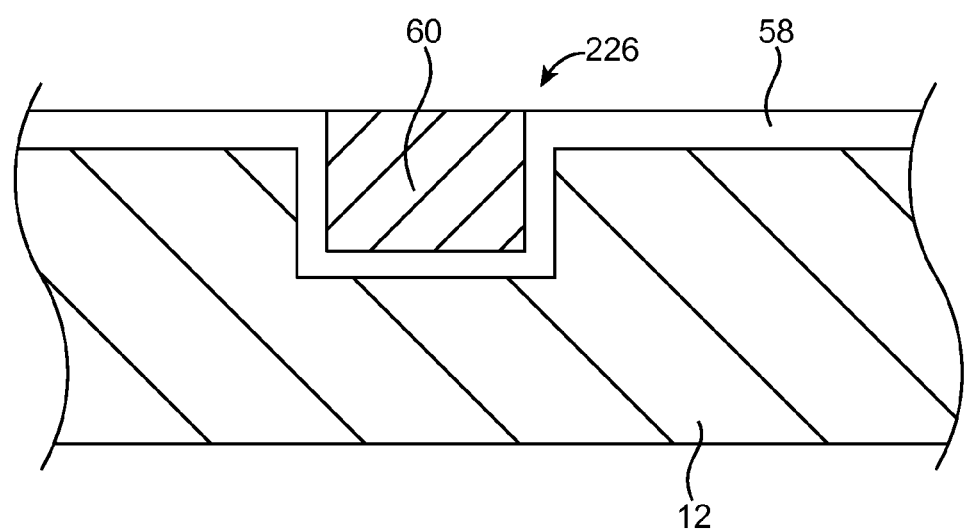
FIG. 26 is a cross-sectional side view of a portion of an illustrative electronic device housing having a channel filled with dielectric and conductive material to form a signal path in accordance with an embodiment.
Figure 27:
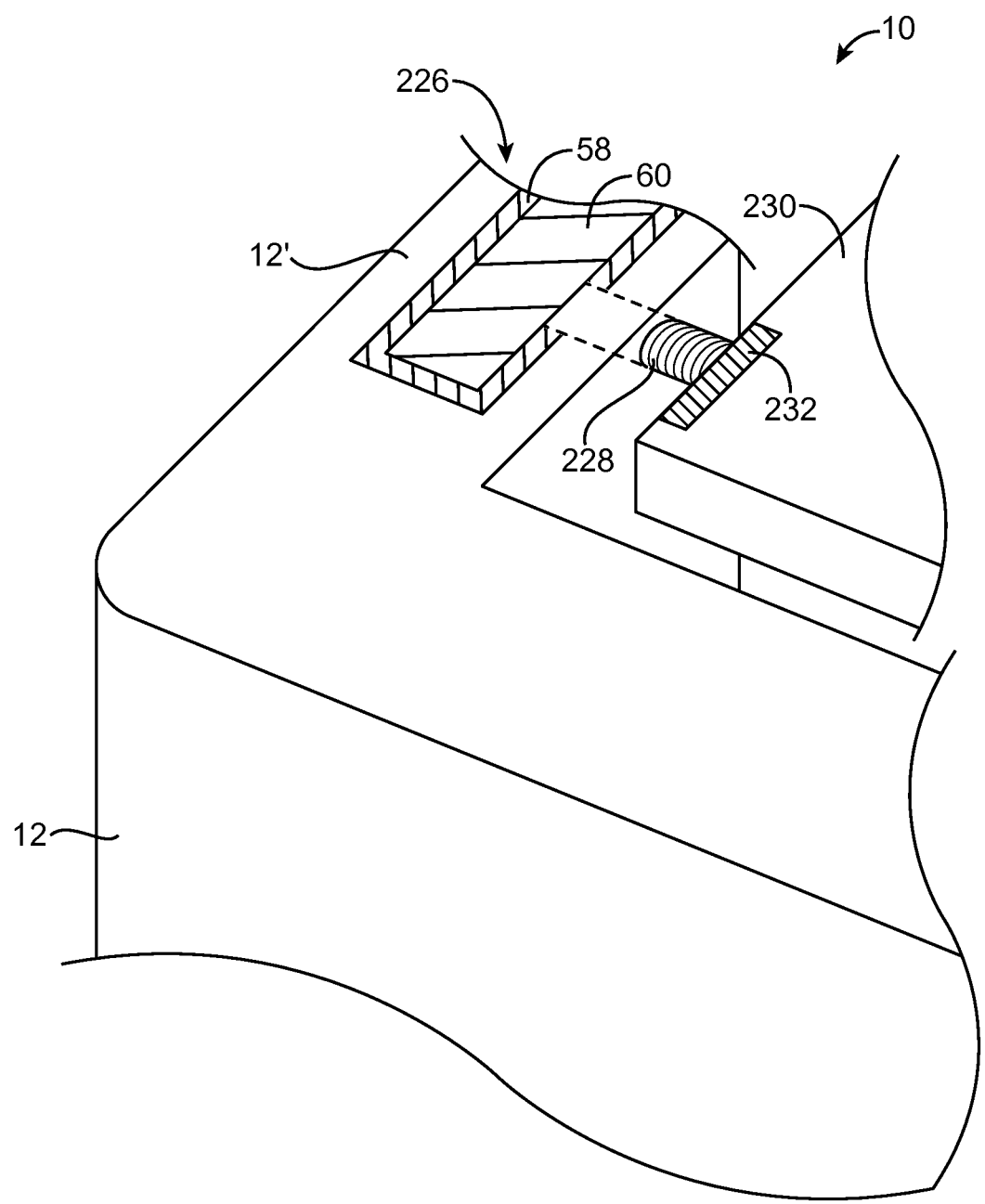
FIG. 27 is a perspective view of an illustrative electronic device housing having a signal path coupled to a printed circuit using a spring-loaded pin in accordance with an embodiment.

FIG. 26 is a cross-sectional side view of housing 12 in an illustrative configuration in which a signal path in interconnect stack 64 has been formed by placing metal trace 60 in a groove such as groove 226 in housing 12. Groove 226 may be machined in housing 12 using a machining tool (e.g., a milling bit), may be cut using a laser, or may be formed using other techniques. Housing 12 may be a metal housing or a housing formed from other material. Dielectric layer 58 may be interposed between trace 60 and housing 12 to prevent trace 60 from being shorted to housing 12. Additional layers of dielectric 58 may be formed over traces such as trace 60. There is one trace in groove 226, but, if desired, groove 226 may contain multiple parallel traces and/or multiple grooves 226 may be formed in housing 12 to form housing-based signal paths for device 10.

If desired, signal paths may be formed in sidewall portions of housing 12, as shown by illustrative metal trace 60 in groove 226 in housing sidewall 12' in housing 12. Dielectric layer 58 may be used to prevent metal trace 60 from being shorted to metal housing 12. Coupling structure 228 may be used to couple trace 60 to metal traces in printed circuit 230 such as metal trace 232. Coupling structure 228 may be, for example, a spring loaded pin that contacts trace 60 through an opening in sidewall 12'.

Figure 28:
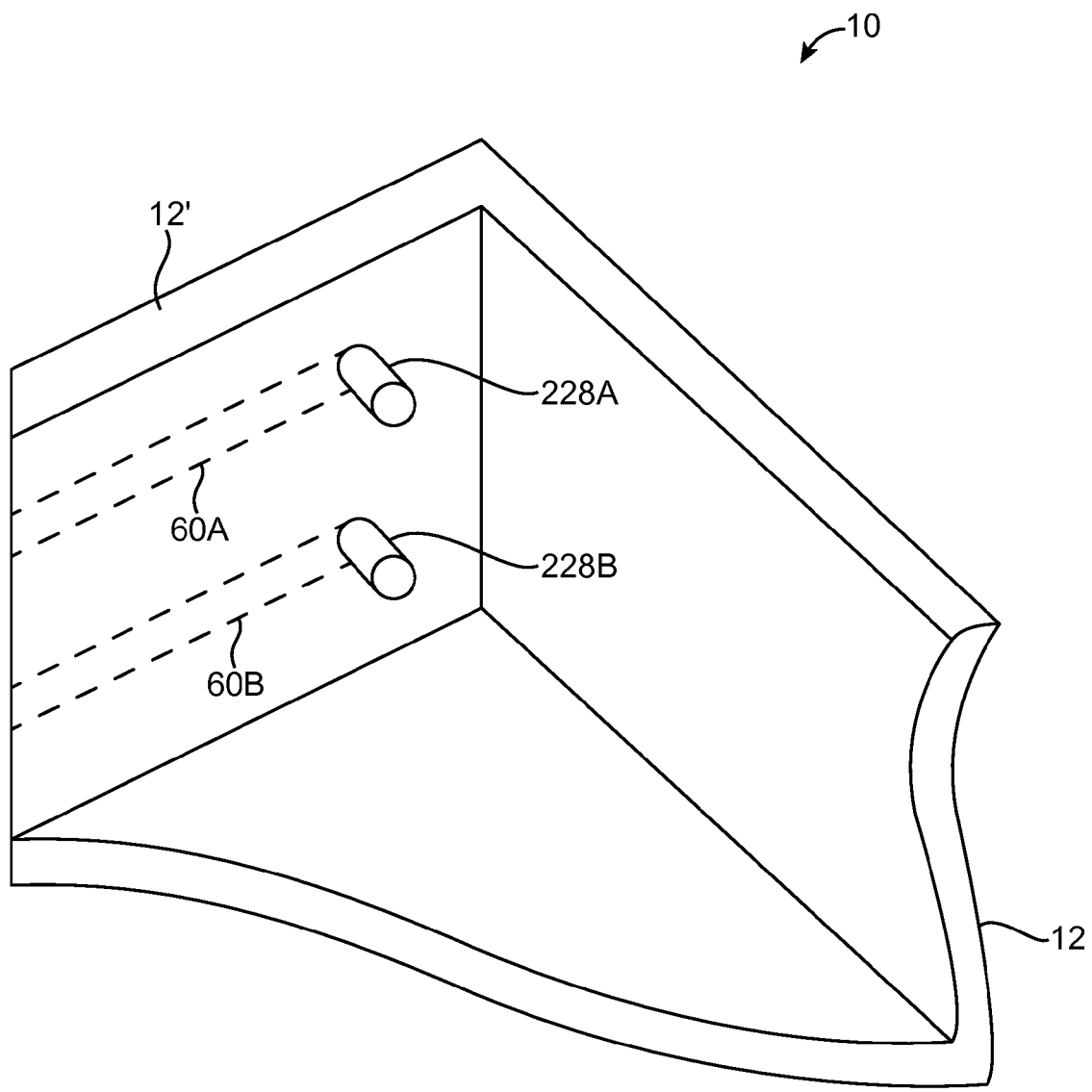
FIG. 28 is a perspective view of an illustrative electronic device having spring-loaded pins at different heights along a housing wall to couple housing-based signal paths to printed circuit paths or other signal paths in accordance with an embodiment.
Figure 29:
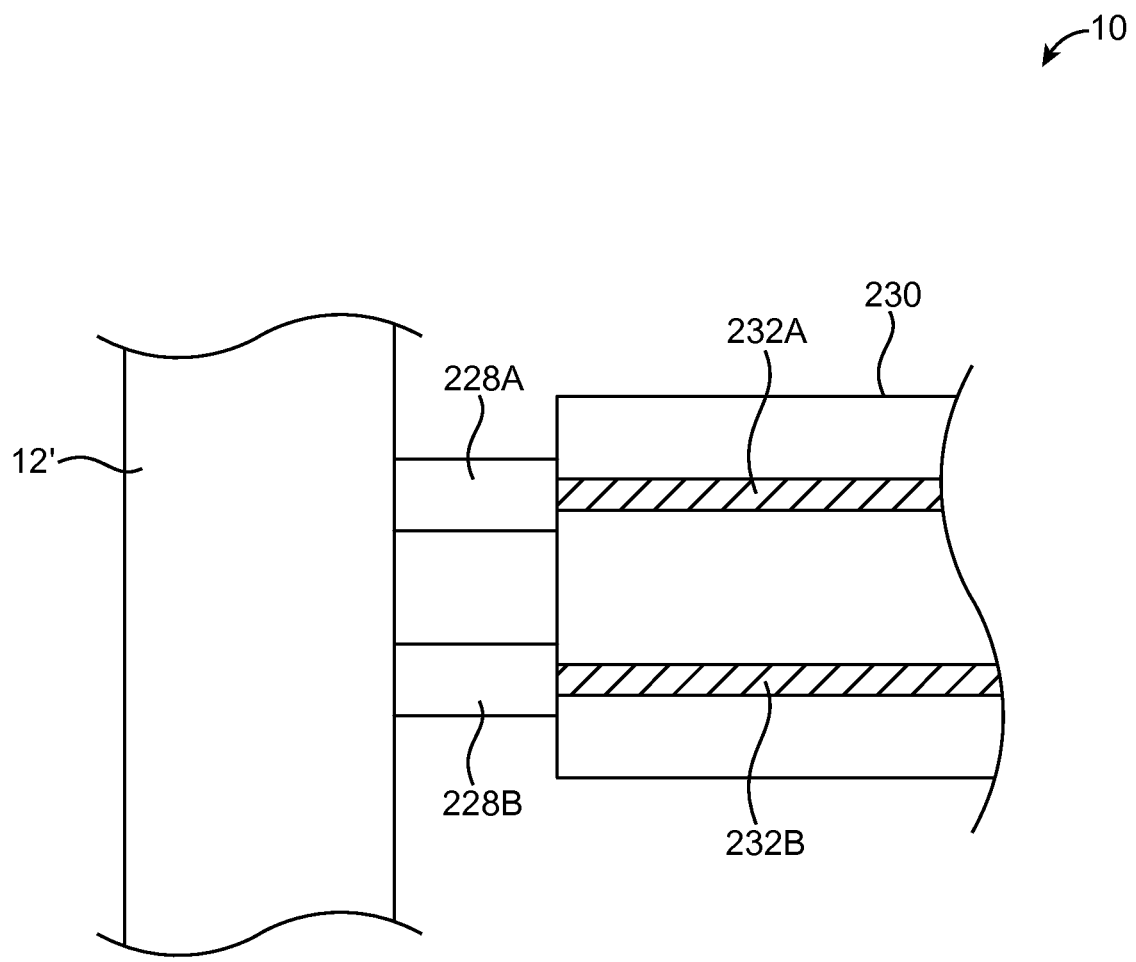
FIG. 29 is a cross-sectional side view of an illustrative electronic device housing wall coupled to a printed circuit using spring-loaded pins at different positions on the housing wall in accordance with an embodiment.

If desired, multiple housing-based signal paths may be formed in a groove in housing sidewall 12'. As shown in FIG. 28, signal path 60B may be formed at a first vertical location in sidewall 12' and may be coupled to a printed circuit or other structure using a first spring-loaded pin 228B or other coupling structure. Parallel signal path 60A may be formed at a second vertical location in sidewall 12' and may be coupled to the printed circuit or other structure using a second spring-loaded pin 228A or other coupling structure. FIG. 29 is a cross-sectional side view showing how coupling structures such as spring-loaded pins 228A and 228B of FIG. 29 may be coupled to respective traces 232A and 232B in printed circuit 230.

Figure 30:
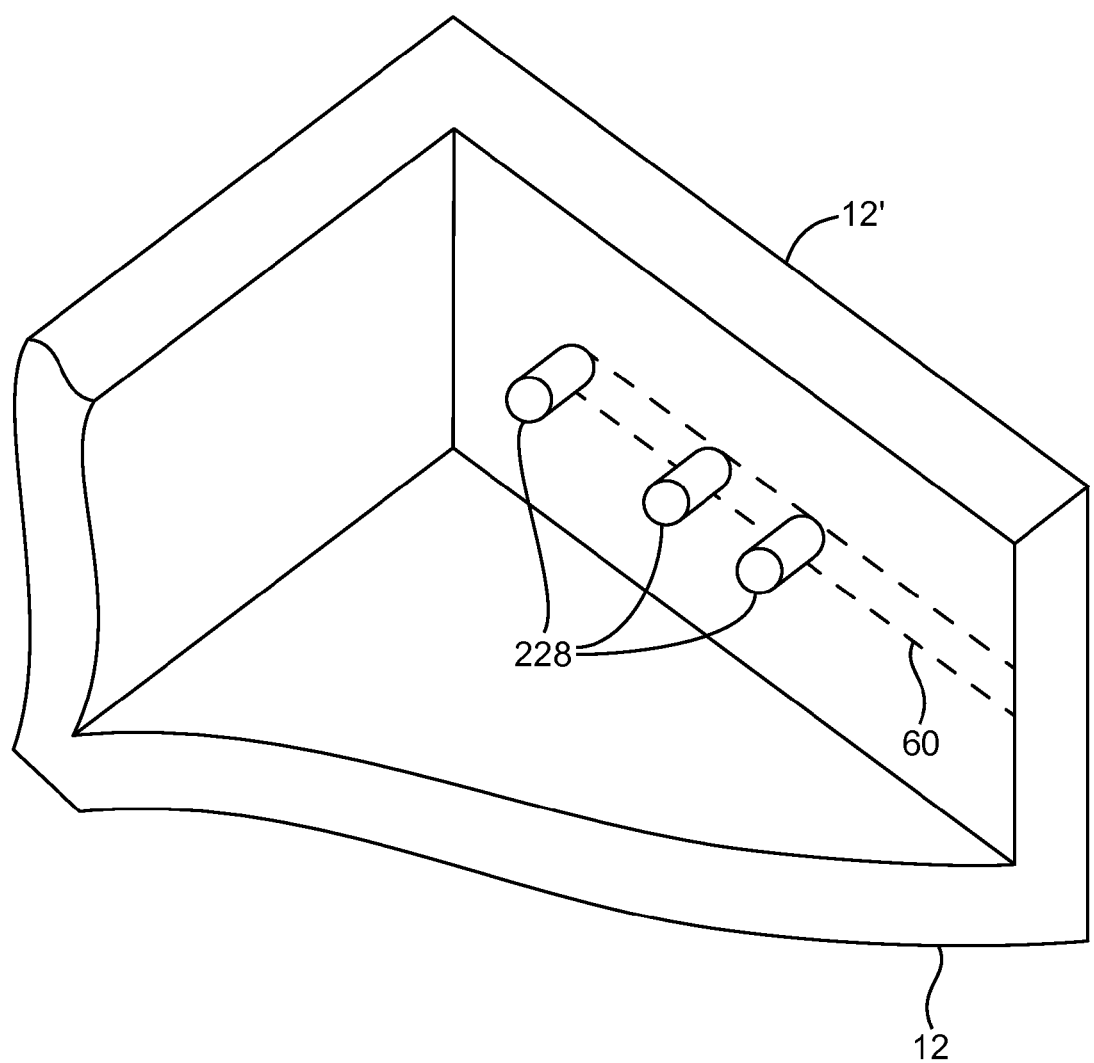
FIG. 30 is a perspective view of an illustrative electronic device having spring-loaded pins at different lateral locations along a housing wall to couple housing-based signal paths to printed circuit paths or other signal paths in accordance with an embodiment.

As shown in the illustrative configuration of FIG. 30, coupling structures such as spring-loaded pins 228 may be coupled to metal trace(s) 60 at multiple distinct horizontal locations along housing sidewall 12'. There may be a separate signal path coupled to each pin 228 of FIG. 30, multiple pins 228 may be coupled to a common metal trace on housing 12', or other signal path configurations may be used in interconnecting the housing-based signal paths formed from metal trace(s) 60 to coupling structures such as pins 228 of FIG. 30.

Figure 31:
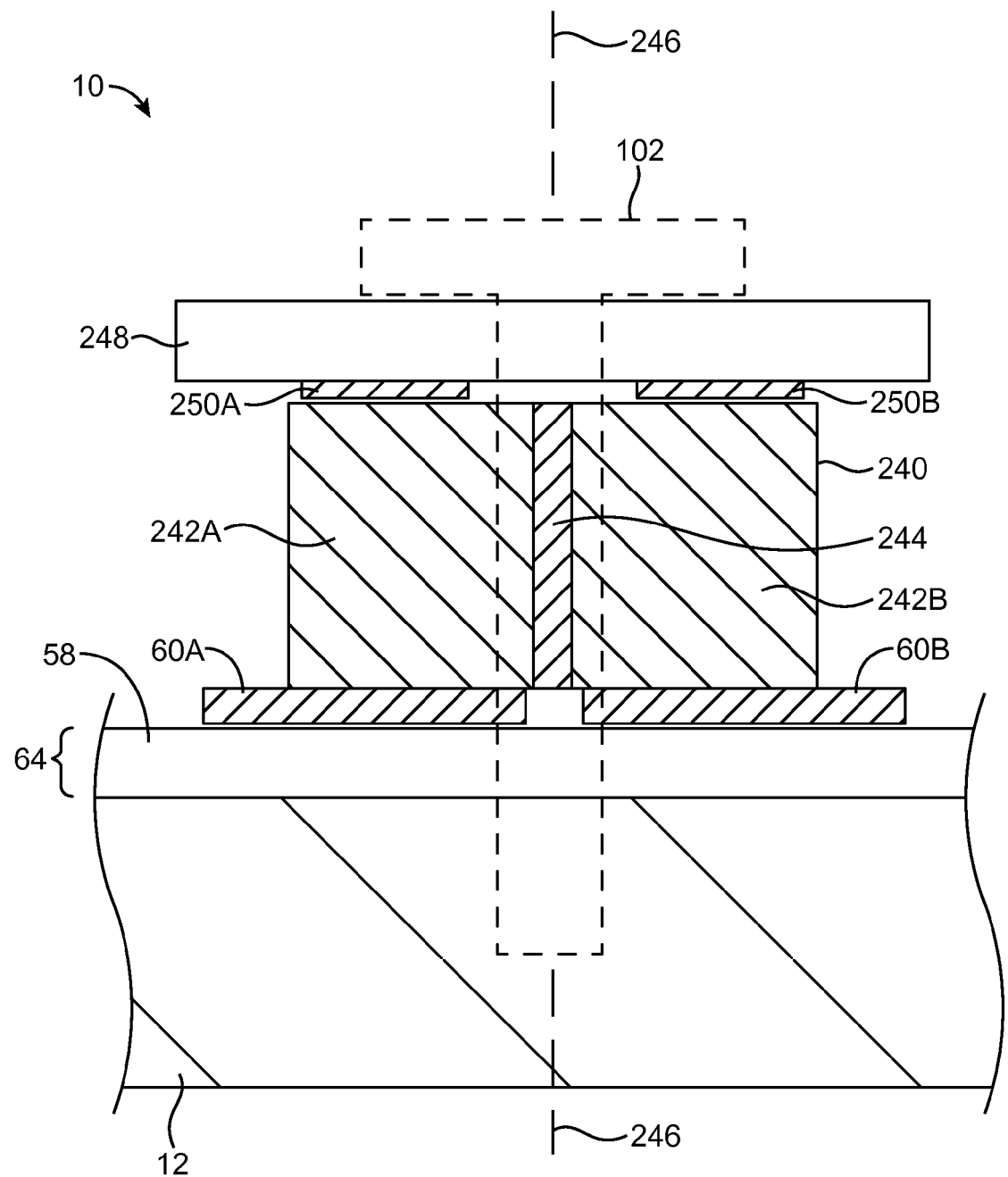
FIG. 31 is a cross-sectional side view of an illustrative printed circuit coupled to signal paths on an electronic device housing using a segmented gasket with respective signal paths in accordance with an embodiment.

If desired, coupling structures such as washers, standoffs, or other structures may be used in coupling housing-based signal paths on housing 12 to signal paths in a printed circuit or other structure in device 10. Consider, as an example, the arrangement of FIG. 31. As shown in the illustrative cross-sectional side view of housing 12 of FIG. 31, device 10 may have housing-based signal paths formed from interconnect stack 64 on the interior surface of housing 12. Interconnect stack 64 may contain signal paths formed from separate metal traces 60A and 60B on dielectric layer 58. Coupling structure 240 may be segmented into two halves 242A and 242B separated by dielectric 244 and running along longitudinal axis 246. Coupling structure may be a ring-shaped washer with an central opening, may be a threaded standoff in housing 12, may be a threaded nut, or may have other configurations.

The center of structure 240 may have an opening that receives screw 102. Screw 102 may be electrically insulated from washer 240, housing 12, and the signal paths in printed circuit 248 (as an example). Printed circuit 248 may have signal paths formed using metal traces such as metal traces 250A and 250B. Electrical components may be mounted on printed circuit 248 or may otherwise be connected to the signal paths on printed circuit 248. With this configuration, signal path 250A on printed circuit 248 is coupled to signal path 60A on housing 12 using segment 242A of structure 240 and, in parallel, signal path 250B on printed circuit 248 is coupled to signal path 60B on housing 12 using segment 242B of structure 240. Dielectric 244 ensures that these two parallel signal paths are not shorted to each other. If desired, coupling structure 240 may contain three or more parallel signal paths. The configuration of FIG. 31 in which structure 240 has two parallel signal paths is merely illustrative.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
    an electronic device housing having an inner surface;
    an interconnect stack on the inner surface that includes a signal line formed from a metal trace;
    an electrical component; and
    a coupling structure that electrically couples the signal line to the electrical component, wherein the coupling structure comprises a fastener, wherein the fastener has at least two parallel signal paths that are isolated from each other by dielectric, wherein the fastener has first and second opposing sides, wherein a first signal path of the at least two parallel signal paths is formed on the first side of the fastener, wherein a second signal path of the at least two parallel signal paths is formed on the second side of the fastener, and wherein the dielectric is interposed between the first and second signal paths.

2. The electronic device defined in claim 1 further comprising a printed circuit to which the electrical component is mounted.

3. The electronic device defined in claim 1 wherein the electrical component comprises a battery.

4. The electronic device defined in claim 1 wherein the electrical component comprises a button.

5. The electronic device defined in claim 4 wherein the housing has an opening and wherein the button has a button member that passes through the opening.

6. The electronic device defined in claim 1 wherein the housing is a metal housing.

7. An electronic device, comprising:
    an electronic device housing having an inner surface;
    an interconnect stack on the inner surface that includes a signal line formed from a metal trace;
    an electrical component; and
    a coupling structure that electrically couples the signal line to the electrical component, wherein the interconnect stack has a right-angle bend that follows a right-angle bend in the electronic device housing.

8. An electronic device, comprising:
    an electronic device housing having an inner surface;
    an interconnect stack on the inner surface that includes a signal line formed from a metal trace;
    an electrical component; and
    a coupling structure that electrically couples the signal line to the electrical component, wherein the housing has a protruding portion and wherein the interconnect stack comprises layers of material on the protruding portion.

9. An electronic device, comprising:
    an electronic device housing having an inner surface;
    an interconnect stack on the inner surface that includes a signal line formed from a metal trace;
    an electrical component; and
    a coupling structure that electrically couples the signal line to the electrical component, wherein the coupling structure comprises a fastener, wherein the fastener has at least two parallel signal paths that are isolated from each other by dielectric, wherein the interconnect stack on the inner surface includes an additional signal line formed from an additional metal trace, wherein a first signal path of the at least two parallel signal paths is directly coupled to the signal line, and wherein a second signal path of the at least two parallel signal paths is directly coupled to the additional signal line.

* * * * *